(12) United States Patent
Pan et al.

(10) Patent No.: US 10,392,936 B2
(45) Date of Patent: Aug. 27, 2019

(54) TAR MAT FORMATION PREDICTION IN LATE-CHARGE RESERVOIRS

(71) Applicant: Schlumberger Technology Corporation, Sugar Land, TX (US)

(72) Inventors: Shu Pan, Sugar Land, TX (US); Youxiang Zuo, Burnaby (CA); Yi Chen, Sugar Land, TX (US); Kang Wang, Beijing (CN); Oliver C. Mullins, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 169 days.

(21) Appl. No.: 15/279,828

(22) Filed: Sep. 29, 2016

(65) Prior Publication Data

US 2017/0016321 A1 Jan. 19, 2017

Related U.S. Application Data

(63) Continuation-in-part of application No. 14/927,305, filed on Oct. 29, 2015.
(Continued)

(51) Int. Cl.
*E21B 43/00* (2006.01)
*E21B 49/08* (2006.01)
(Continued)

(52) U.S. Cl.
CPC ............ *E21B 49/10* (2013.01); *E21B 43/00* (2013.01); *E21B 49/088* (2013.01); *G06F 17/10* (2013.01);
(Continued)

(58) Field of Classification Search
None
See application file for complete search history.

(56) References Cited

U.S. PATENT DOCUMENTS

| | | |
|---|---|---|
| 6,662,110 B1 | 12/2003 | Bargach et al. |
| 6,968,909 B2 | 11/2005 | Aldred et al. |
| (Continued) | | |

FOREIGN PATENT DOCUMENTS

| | | |
|---|---|---|
| WO | 2010010455 A3 | 5/2010 |
| WO | 2010010453 A3 | 6/2010 |
| WO | 2010043951 A4 | 9/2010 |

OTHER PUBLICATIONS

International Preliminary Report on Patentability issued in related application PCT/US2015/041064, dated Jan. 24, 2017 (9 pages).
(Continued)

*Primary Examiner* — Gregory J Toatley, Jr.
*Assistant Examiner* — Terence E Stifter, Jr.
(74) *Attorney, Agent, or Firm* — Sara K. M. Hinkley

(57) ABSTRACT

A downhole tool, surface equipment, and/or remote equipment are utilized to obtain data associated with a subterranean hydrocarbon reservoir, fluid contained therein, and/or fluid obtained therefrom. At least one condition indicating that a density inversion exists in the fluid contained in the reservoir is identified from the data. Molecular sizes of fluid components contained within the reservoir are estimated from the data. A model of the density inversion is generated based on the data and molecular sizes. The density inversion model is utilized to estimate the density inversion amount and depth and time elapsed since the density inversion began to form within the reservoir. A model of a gravity-induced current of the density inversion is generated based on the data and the density inversion amount, depth, and elapsed time.

20 Claims, 8 Drawing Sheets

Related U.S. Application Data

(60) Provisional application No. 62/028,213, filed on Jul. 23, 2014, provisional application No. 62/234,433, filed on Sep. 29, 2015.

(51) Int. Cl.
  *E21B 49/10* (2006.01)
  *G01V 11/00* (2006.01)
  *G06F 17/10* (2006.01)
  *G01V 7/00* (2006.01)

(52) U.S. Cl.
  CPC .......... *E21B 2049/085* (2013.01); *G01V 7/00* (2013.01); *G01V 11/00* (2013.01); *G01V 2210/6165* (2013.01); *G01V 2210/644* (2013.01); *G01V 2210/663* (2013.01)

(56) References Cited

U.S. PATENT DOCUMENTS

| | | | |
|---|---|---|---|
| 7,913,773 | B2 | 3/2011 | Li et al. |
| 8,587,302 | B2 | 11/2013 | Venkataramanan et al. |
| 8,825,408 | B2 * | 9/2014 | Freed ................ E21B 49/00 166/264 |
| 2006/0155472 | A1 * | 7/2006 | Venkataramanan .... E21B 49/00 702/10 |
| 2006/0155474 | A1 | 7/2006 | Venkataramanan et al. |
| 2007/0038375 | A1 | 2/2007 | Jalali et al. |
| 2007/0062692 | A1 | 3/2007 | Estevez et al. |
| 2009/0248310 | A1 * | 10/2009 | Zuo ................ E21B 47/102 702/11 |
| 2012/0095603 | A1 | 4/2012 | Rashid et al. |
| 2013/0025939 | A1 | 1/2013 | Heliot et al. |
| 2014/0156238 | A1 | 6/2014 | Rashid et al. |
| 2014/0166871 | A1 | 6/2014 | Jamison et al. |
| 2014/0253116 | A1 * | 9/2014 | Freedman .......... G01R 33/30 324/303 |
| 2016/0047208 | A1 | 2/2016 | Chen |

OTHER PUBLICATIONS

Bickle, et al. "Modelling carbon dioxide accumulation at Sleipner: Implications for underground carbon storage," Earth and Planetary Science Letters, vol. 255, (2007), pp. 164-176.
Hesse, et al. "Gravity currents in horizontal porous layers: transition from early to late self-similarity," Journal of Fluid Mechanics, (2007), vol. 577, pp. 363-383.
Hesse, et al. "Gravity currents with residual trapping," Journal of Fluid Mechanics, (2008), vol. 611, pp. 35-60.
Huppert, et al. "Gravity-driven flows in porous layers," J. Fluid Mech., (1995), vol. 292, pp. 55-69.
Indo, et al. "Asphaltene Nanoaggregates Measured in a Live Crude Oil by Centrifugation," Energy & Fuels, (2009), vol. 23, pp. 4460-4469.
Leahy, et al. "Application of gravity currents to the migration of CO2 in heterogeneous saline formations," Energy Procedia 1 (2009), pp. 3331-3338.
Lyle, et al. "Axisymmetric gravity currents in a porous medium," Journal of Fluid Mechanics, (2005), vol. 543, pp. 293-302.
Mullins, et al. "Asphaltene nanoscience arid reservoir fluid gradients, tar mats and the oil-water interface," SPE 166278, (2013), SPE Annual Technical Conference and Exhibition held in New Orleans, Louisiana, USA, Sep. 30-Oct. 2, 2013, pp, 1-14.
Mullins "The Physics of Reservoir Fluids—Discovery through Downhole Fluid Analysis," Schlumberger Press, Houston, TX, (2011), pp. 1-4.
Pritchard, et al. "On the slow draining of a gravity current moving through a layered permeable medium," Journal of Fluid Mechanics, vol. 444, (2001), pp. 23-47.
Seifert, et al. "Mobile Heavy Oil and Tar Mat Characterization Within a Single Oil Column Utilizing Novel Asphaltene Science," SPE 163291, (2012), prepared for presentation at the SPE Kuwait International Petroleum Conference and Exhibition held in Kuwait City, Kuwait, Dec. 10-12, 2012, pp. 1-12.
Seifert, et al. "Black Oil, Heavy Oil and Tar in One Oil Column Understood by Simple Asphaltene Nanoscience," SPE 161144, (2012), prepared for presentation at the Abu Dhabi International Petroleum Exhibition & Conference held in Abu Dhabi, UAE, Nov. 11-14, 2012, pp. 1-11.
Vella, et al. "Gravity currents in a porous medium at an inclined plane," J. Fluid Mech., (2006), vol. 555, pp. 353-362.
Zuo, et al. "Advanced Reservoir and Tar Mat Evaluation Using Downhole Fluid Analysis and Asphaltene Flory-Huggins-Zuo EoS," IPTC 16649, (2013), prepared for presentation at the International Petroleum Technology Conference held in Beijing, China, Mar. 26-28, 2013, pp. 1-10.
Zuo, et al. "Integration of Downhole Fluid Analysis and the Flory-Huggins-Zuo EOS for Asphaltene Gradients and Advanced Formation Evaluation," SPE 166385, (2013), prepared for presentation at the SPE Annual Technical Conference and Exhibition held in New Orleans, Louisiana, USA, Sep. 30-Oct. 2, 2013, pp. 1-11.
Zuo, et al. "Investigation of Formation Connectivity Using Asphaltene Gradient Log Predictions Coupled with Downhole Fluid Analysis", SPE 124264, (2009), prepared for presentation at the 2009 SPE Annual Technical Conference and Exhibition held in New Orleans, Louisiana, USA, Oct. 4-7, 2009, pp. 1-11.
Zuo, et al. "Integration of Fluid Log Predictions and Downhole Fluid Analysis", SPE 122562, (2009), prepared for presentation at the 2009 SPE Asia Pacific Oil and Gas Conference and Exhibition held in Jakarta, Indonesia, Aug. 4-6, 2009, pp. 1-11.
Mullins et al. "The Dynamics of Fluids in Reservoirs," SPE 166083, 2013, SPE Annual Technical Conference and Exhibition held in New Orleans, Louisiana, USA, Sep. 30-Oct. 2, 2013, pp. 1-11.
Stainforth, John. "New insights into reservoir filling and mixing processes", published in "Understanding Petroleum Reservoirs: Towards an Integrated Reservoir Engineering and Geochemical Approach," The Geological Society London, 2004, pp. 115-132, Special Publication No. 237, Bath, UK.
International Search Report and Written Opinion issued in related application PCT/US2015/041064 dated Mar. 16, 2016, 12 pages.

* cited by examiner

TAR MAT FORMATION PREDICTION IN LATE-CHARGE RESERVOIRS

CROSS-REFERENCE TO RELATED APPLICATIONS

This application is a continuation-in-part of U.S. application Ser. No. 14/927,305, entitled "Tar Mat Formation Prediction in Late-Charge Reservoirs," filed Oct. 29, 2015, which claims priority to and the benefit of U.S. Provisional Application No. 62/028,213, entitled "Prediction of Tar Mat Formation in Reservoirs with Late Light Hydrocarbons Charge," filed Jul. 23, 2014. This application also claims priority to and the benefit of U.S. Provisional Application No. 62/234,433, entitled "Tar Mat Formation Prediction in Late-Charge Reservoirs," filed Sep. 29, 2015. The entire disclosure of each of said applications is hereby incorporated herein by reference.

BACKGROUND OF THE DISCLOSURE

Tar mat formation studies aid understanding of the formation mechanism, locations, and intervals favorable for tar formation, which may be utilized to minimize drilling in tar-rich zones and/or avoid completing a tar zone. Thus, operators may take measures to understand the origin and distribution of tar mat in reservoirs, perhaps including providing a reliable prediction of specific occurrences of tar mat prior to drilling.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a system that includes a downhole tool operable within a wellbore extending from a wellsite surface into a subterranean hydrocarbon reservoir. The downhole tool is operable to obtain fluid from the reservoir and data associated with the obtained fluid. The system also includes an apparatus operable to identify at least one condition indicating that a density inversion exists in the fluid contained in the reservoir based on the obtained data.

The present disclosure also introduces a system that includes a downhole tool operable to obtain fluid from a subterranean reservoir at multiple depths within the reservoir. The downhole tool is also operable to obtain data associated with the obtained fluid, including gas-oil ratio (GOR) and composition data related to the fluid obtained at each of the depths. The system also includes an apparatus operable to identify at least one condition indicating that a density inversion exists in the fluid contained in the reservoir based on the obtained data. The at least one condition includes at least one of: (i) a first condition in which there exists a disequilibrium gradient of GOR relative to depth within the reservoir, as determined based on the GOR data at each of the plurality of depths; and/or (ii) a second condition in which there exists an accumulation of asphaltenes proximate a lower base of the reservoir, as determined based on the composition data at each of the plurality of depths.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
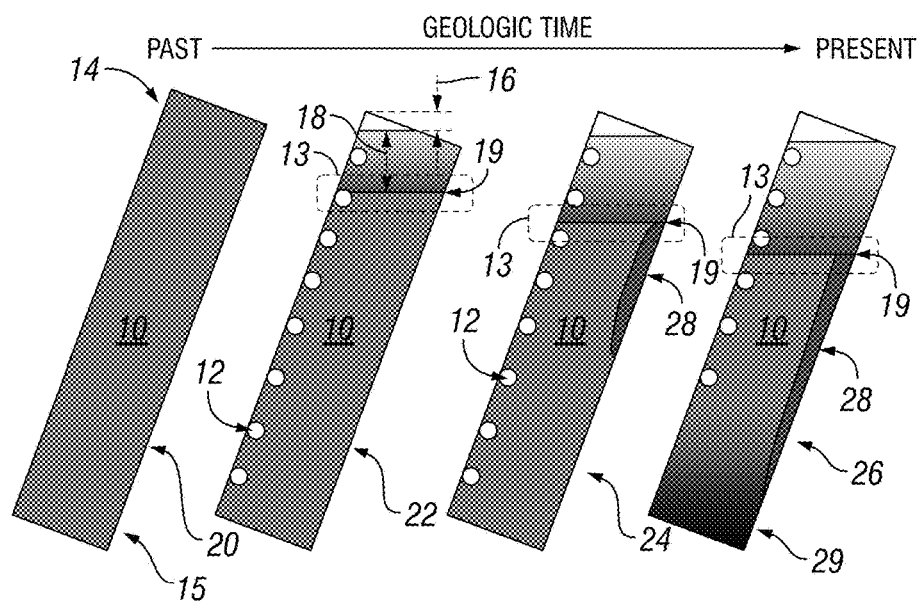
FIG. 1 is a chart demonstrating one or more aspects related to the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure introduces workflows, methods, and/or other processes in which reservoir testing data is performed to determine parameters pertaining to a subterranean hydrocarbon reservoir. An asphaltene concentration gradient analysis (ACGA) workflow may also be performed to obtain information pertaining to molecular sizes of hydrocarbon components located in the reservoir. A density inversion model may be generated utilizing the determined parameters and the obtained molecular size information. The density inversion model may be utilized to determine an amount of density inversion and its appearance location and time. A gravity current model may be generated utilizing the density inversion model information. Downslope velocity and distance of denser fluid may then be determined based on the gravity current model, from which tar mat formation may be predicted. The present disclosure also introduces systems, apparatus, and program products for performing at least a portion of such workflows, methods, and/or other processes.

With respect to fields having a long and/or thick tar mat, it has been found that biodegradation, water-washing, and other mechanisms may not be able to provide a sufficient explanation and/or characterization of the tar mat. The present disclosure introduces aspects related to the tar mat formation mechanism due to late light hydrocarbons charge as an avenue to explaining the tar mat formation.

For example, the tar mat formation mechanism due to late light hydrocarbons (gas) charge in reservoirs can be utilized to qualitatively explain the tar mat phenomenon. Such an approach may account for the effects of late gas charge on fluid properties, such as gas-oil ratio (GOR) and asphaltene instability, which may demonstrate denser fluid occurrence due to the asphaltene cluster integration, and its migration to the reservoir base driven by gravity.

FIG. 1 is a schematic view depicting four stages, in geologic time (increasing from left to right relative to the page), of a reservoir 10 undergoing tar mat formation due to a late charge of light hydrocarbons 12. In the first depicted stage 20, before commencement of the charge 12 into the reservoir 10, the fluid in the reservoir 10 is assumed to be homogeneous fluid primarily including two main constituents, namely, a first constituent primarily comprising maltenes (perhaps comprising gas), and a second constituent primarily comprising asphaltenes.

In the second depicted stage 22 after the inflow of the hydrocarbon charge 12, the late (new) gas migrates rapidly to the top 14 of the reservoir 10, such as through channels (not shown) extending within the reservoir 10 in a direction having at least some vertical component. After migrating to the top of the reservoir 10 and creating a contact displacement 16, the gas dissolves into the oil phase under high pressure. Thus, the rich gas near the top 14 of the reservoir 10 creates a concentration difference 18 of gas in the oil column of the reservoir 10, extending from the contact displacement 16 down to a diffusion front 19.

Subsequently, as in the third depicted stage 24, the dissolved gas diffuses down along the oil column, which in turn causes a concentration difference of maltenes and asphaltenes. Thus, these three components diffuse down towards the base 15 of the reservoir 10. According to the solubility parameter of different components, the light gas components can expel the heavy asphaltenes components out the oil phase. Therefore, asphaltenes form larger clusters or otherwise become unstable and separate from the oil phase. These clusters aggregate and are pushed downward by the diffusion front 19. Thus, an inversion 13 of the bulk density will eventually exist, where fluid near the diffusion front 19 will be of higher density than that at lower depths, due to an accumulation of asphaltenes caused by repulsion of the asphaltenes below the diffusion front 19. After sufficient time, gravity will drive the denser fluid as a current down towards the base 15, as indicated in FIG. 1 by reference numeral 28. Eventually, as in the fourth depicted stage 26, the gravity-induced current of the asphaltenes will accumulate in the base 15, thus forming a high viscous tar mat 29 over a very large area.

However, the above mechanism and other existing knowledge merely explain tar mat formation qualitatively. Field case validation may provide a better understanding regarding how the density inversion 13 appeared as a result of the late gas charge 12, and how the denser fluid migrated to the base 15 and deposited there to form the tar mat 29 within geologic time. The present disclosure introduces one or more aspects that may be utilized to identify tar mat formation possibility in hydrocarbon reservoirs based on the above-described tar mat formation resulting from late light hydrocarbon charge. By integrating the diffusion mechanism with a gravity current model, the likelihood of tar mat occurring may be determined, and a particular status may be further formed, thus permitting analysis of tar mat formation within geologic time and reservoir connectivity.

Figure 2:
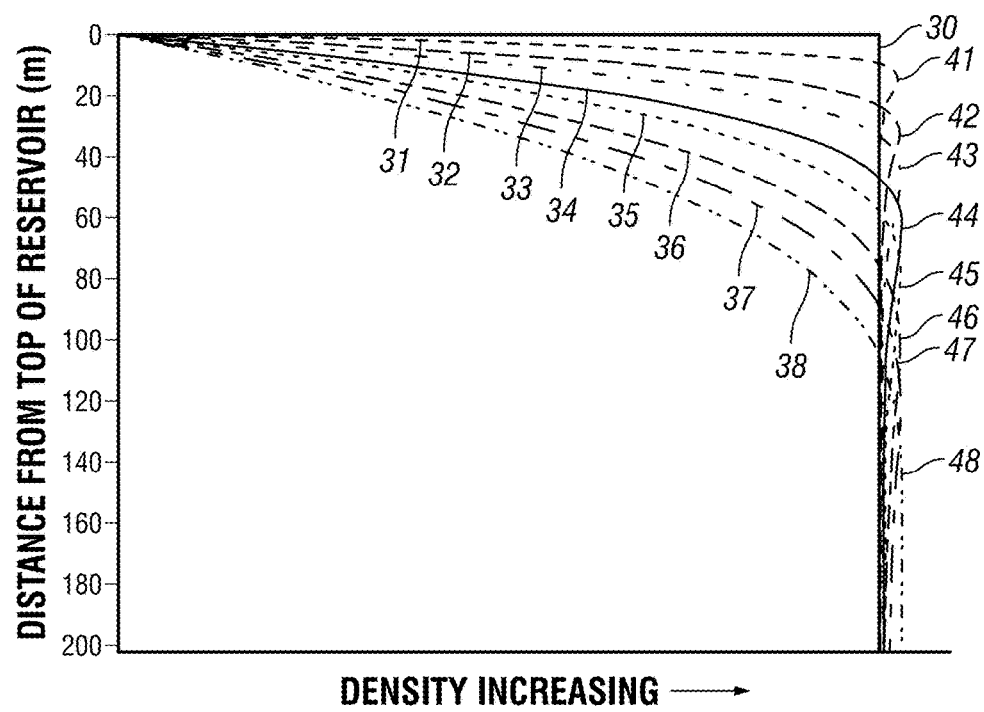
FIG. 2 is a graph demonstrating one or more aspects related to the present disclosure.

FIG. 2 is a graph depicting an example prediction result of the fluid density in the oil column at different times. The graph includes a first curve 30 representing bulk fluid density relative to depth within the original reservoir before the late gas charge, depicting the assumption that the bulk fluid density of the oil column is substantially constant relative to depth. A second curve 31 represents the bulk fluid density relative to depth at about 10,000 years after commencement of the late gas charge, and depicts a density inversion 41 at about 15 meters (m) from the top of the reservoir. Another curve 32 represents the bulk fluid density relative to depth after about 50,000 years, and depicts a density inversion 42 at about 35 m from the top of the reservoir. The next three curves 33, 34, and 35 represent elapsed times of 100,000 years, 200.00 years, and 300,000 years, respectively, with corresponding density inversions 43, 44, and 45 existing at about 45 m, about 65 m, and about 85 m, respectively. The remaining three curves 36, 37, and 38 represent elapsed times of 500,000 years, 700,000 years, and 1,000,000 years, respectively, with corresponding density inversions 46, 47, and 48 existing at about 105 m, about 125 m, and about 155 m, respectively. Thus, as depicted in the example shown in FIG. 2, the density inversion caused denser fluid to flow downward towards the base, driven by gravity. One may also deduce from FIG. 2 that, for example, the accumulated, denser fluid probably formed a tar mat in the reservoir base.

The present disclosure introduces modeling the mechanism of tar mat formation due to late light hydrocarbons charge by the combination of a density inversion model and a gravity-induced current model. One or more aspects of the methods introduced herein may be utilized to dynamically predict the fluid density in the oil column and, in turn, obtain a better understanding of the possibility of tar mat occurrence and its formation status within geological time. This may include utilizing diffusion equations and/or related information to describe the molecular migration caused by the concentration difference. Such approach may be utilized in areas such as oil and gas, chemicals, fluid mechanics, and other example implementations in which denser fluid forms and migrates to the base of the reservoir, including implementations in which the density inversion and gravity induce horizontal fluid flow. For example, even for horizontal flow in a porous medium, the gravity current model may be successfully applied.

One or more aspects of the present disclosure may also be integrated with wireline reservoir testing (WRT) and ACGA. For example, WRT may provide information such as reservoir depth, pressure, temperature, fluid composition, density, and viscosity, among other parameters and/or characteristics, and the molecular sizes of the compositional components of fluid obtained via WRT may be obtained via ACGA.

An example workflow introduced herein may comprise three parts: data acquisition, the density inversion calculation, and the gravity-induced current simulation. Data from three aspects may be collected for the parameters/inputs to a simulator. Subsequently, the fluid density in the oil column over geologic time may be successfully predicted. The subsequently obtained understanding of tar mat formation may then be delivered after analyzing the denser fluid transport in the reservoir.

The density inversion model may be a one-dimensional (1-D), single-phase model. The reservoir fluid may be described as a single-liquid phase comprising three components: gas (typically methane and perhaps some other light hydrocarbons), maltenes, and asphaltenes. That is, as described above, once the molecular concentration difference appears, the rich gas dissolves in the top of the oil column and begins diffusing downward along the oil column, and then maltenes and asphaltenes also diffuse downward.

The mass conservation of gas, asphaltenes, and maltenes may be described as set forth below in Equations (1)-(3).

$$\frac{\partial(c_G)}{\partial t} + \frac{\partial(c_G u_G)}{\partial z} = 0 \tag{1}$$

$$\frac{\partial(c_A)}{\partial t} + \frac{\partial(c_A u_A)}{\partial z} = 0 \tag{2}$$

$$\frac{\partial(c_M)}{\partial t} + \frac{\partial(c_M u_M)}{\partial z} = 0 \tag{3}$$

where:
subscripts G, A, and M represent gas, asphaltenes, and maltenes, respectively;
c is molarity (molar concentration) of each component;
u is migration velocity of each component;
t is time; and
z is the space coordinate originating from a lower boundary, such as the oil-water-contact (OWC) at the base of the reservoir.

The initial condition can be expressed as set forth below in Equations (4)-(6).

$$c_G = 0.0, t = 0 \tag{4}$$

$$c_A = c_{A0}, t = 0 \tag{5}$$

$$c_M = c_{M0}, t = 0 \tag{6}$$

where:
$c_{A0}$ is the initial molarity of asphaltenes; and
$c_{M0}$ is the initial molarity of maltenes.

At the fixed bottom of the oil column, a non-permeable boundary condition may be applied to each component, as set forth below in Equations (7)-(9).

$$u_G = 0.0, z = 0 \tag{7}$$

$$u_A = 0.0, z = 0 \tag{8}$$

$$u_M = 0.0, z = 0 \tag{9}$$

The top of the oil column (i.e., the gas-oil-contact (GOC)) is a moving boundary, which is non-permeable for maltenes and asphaltenes, but gas is saturated with oil at the GOC. Thus, assuming the location of the GOC is Z(t), the component migration velocities may be expressed as set forth below in Equations (10)-(12).

$$c_G(t, Z(t)) = k_G c_M, z = Z(t) \tag{10}$$

$$u_A(t, Z(t)) = \frac{dZ(t)}{dt}, z = Z(t) \tag{11}$$

$$u_M(t, Z(t)) = \frac{dZ(t)}{dt}, z = Z(t) \tag{12}$$

where $k_G$ is solubility value (equilibrium constant) of gas in maltenes at specified temperature and pressure.

Since no maltenes are lost from the system, Z(t) satisfies Equations (13) and (14) set forth below.

$$Z(0) = L \tag{13}$$

$$\int_0^{Z(t)} c_G(t, Z(t)) dz = c_{M0} L \tag{14}$$

where L is the original height of the oil column.

To introduce constitutive diffusion equations to the equations above, the reference frame of diffusion flux may be defined. The reference frame may include mass average, molar average, volume average, and solvent fixed, for example. In some implementations, the solvent fixed frame of reference may provide a simpler form of boundary conditions. Thus, the diffusion flux J of each component may be expressed as set forth below in Equations (15)-(17).

$$J_G = c_G(u_G - u_M) \tag{15}$$

$$J_A = c_A(u_A - u_M) \tag{16}$$

$$J_M = 0 \tag{17}$$

Accordingly, Equations (1)-(3) may be rewritten as set forth below in Equations (18)-(20).

$$\frac{\partial(c_G)}{\partial t} = -\frac{\partial(J_G + c_G u_M)}{\partial z} \tag{18}$$

$$\frac{\partial(c_A)}{\partial t} = -\frac{\partial(J_A + c_A u_M)}{\partial z} \tag{19}$$

$$\frac{\partial(c_M)}{\partial t} = -\frac{\partial(c_M u_M)}{\partial z} \tag{20}$$

Similarly, the boundary conditions of Equations (7)-(12) may be rewritten as set forth below in Equations (21)-(26).

$$J_G = 0.0, z = 0 \tag{21}$$

$$J_A = 0.0, z = 0 \tag{22}$$

$$J_M = 0.0, z = 0 \tag{23}$$

$$c_G(t, Z(t)) = k_G c_M, z = Z(t) \tag{24}$$

$$J_A(t, Z(t)) = 0, z = Z(t) \tag{25}$$

$$u_M(t, Z(t)) = \frac{dZ(t)}{dt}, z = Z(t) \tag{26}$$

A space variable $\xi$ may be expressed as set forth below in Equation (27).

$$\xi = \int_0^z c_M(t,z) dz \tag{27}$$

Equations (18)-(26) can be reduced to the format of a classic diffusion equation by transforming the variables that are functions of t and z to functions of t and $\xi$. Such transformation may utilize the relationships set forth below in Equations (28) and (29) for each function $f(t, z)$.

$$\left(\frac{\partial f(t,\xi)}{\partial \xi}\right)_t = \left(\frac{\partial f(t,z)}{\partial z}\right)_t \Big/ \left(\frac{\partial \xi(t,z)}{\partial z}\right)_t = \frac{1}{c_M}\left(\frac{\partial f(t,z)}{\partial z}\right)_t \tag{28}$$

$$\left(\frac{\partial f(t,\xi)}{\partial t}\right)_\xi = \left(\frac{\partial f(t,z)}{\partial t}\right)_z + \left(\frac{\partial f(t,z)}{\partial z}\right)_t \left(\frac{\partial z(t,\xi)}{\partial t}\right)_\xi$$

$$= \left(\frac{\partial f(t,z)}{\partial z}\right)_z - \left(\frac{\partial f(t,z)}{\partial z}\right)_t \frac{\left(\frac{\partial \xi(t,z)}{\partial t}\right)_z}{\left(\frac{\partial \xi(t,z)}{\partial z}\right)_t}$$

$$= \left(\frac{\partial f(t,z)}{\partial z}\right)_z - \left(\frac{\partial f(t,z)}{\partial z}\right)_t \frac{\left(\int_0^z \frac{\partial c_M}{\partial t} dz\right)_z}{c_M(t,z)}$$

$$= \left(\frac{\partial f(t,z)}{\partial z}\right)_z + \left(\frac{\partial f(t,z)}{\partial z}\right)_t \frac{\left(\int_0^z \frac{\partial (c_M u_M)}{\partial z} dz\right)_z}{c_M(t,z)}$$

$$= \left(\frac{\partial f(t,z)}{\partial t}\right)_z + \left(\frac{\partial f(t,z)}{\partial z}\right)_t u_M \tag{29}$$

This leads to Equations (30) and (31) set forth below.

$$\left(\frac{\partial f(t,z)}{\partial z}\right)_t = c_M \left(\frac{\partial f(t,\xi)}{\partial \xi}\right)_t \tag{30}$$

$$\left(\frac{\partial f(t,z)}{\partial t}\right)_z = \left(\frac{\partial f(t,\xi)}{\partial t}\right)_\xi + c_M u_M \left(\frac{\partial f(t,\xi)}{\partial \xi}\right)_t \tag{31}$$

Thus, Equations (18)-(20) may be expressed utilizing t and $\xi$ by applying Equations (30) and (31), as set forth below in Equations (32)-(34).

$$\left(\frac{\partial c_G}{\partial t}\right)_\xi = c_M u_M \left(\frac{\partial c_G}{\partial \xi}\right)_t - c_M \left(\frac{\partial (J_G + c_G u_M)}{\partial \xi}\right)_t = \tag{32}$$

$$-c_M \left(\frac{\partial J_G}{\partial \xi}\right)_t - c_M c_G \left(\frac{\partial u_M}{\partial \xi}\right)_t$$

$$\left(\frac{\partial c_A}{\partial t}\right)_\xi = c_M u_M \left(\frac{\partial c_A}{\partial \xi}\right)_t - c_M \left(\frac{\partial (J_A + c_A u_M)}{\partial \xi}\right)_t = \tag{33}$$

$$-c_M \left(\frac{\partial J_A}{\partial \xi}\right)_t - c_M c_A \left(\frac{\partial u_M}{\partial \xi}\right)_t$$

$$\left(\frac{\partial c_M}{\partial t}\right)_\xi = c_M u_M \left(\frac{\partial c_M}{\partial \xi}\right)_t - c_M \left(\frac{\partial (c_M u_M)}{\partial \xi}\right)_t = -c_M^2 \left(\frac{\partial (c_M u_M)}{\partial \xi}\right)_t \tag{34}$$

Multiplying Equation (32) by $1/c_M$, multiplying Equation (34) by $c_G/c_M^2$, subtracting the former from the latter, and introducing a new composition variable $S_G = c_G/c_M$ results in Equation (35) set forth below.

$$\left(\frac{\partial S_G}{\partial t}\right)_\xi = -\left(\frac{\partial J_G}{\partial \xi}\right)_t \tag{35}$$

Similarly utilizing Equations (33) and (34) and another new composition variable $S_A = c_A/c_M$ results in Equation (36) set forth below.

$$\left(\frac{\partial S_A}{\partial t}\right)_\xi = -\left(\frac{\partial J_A}{\partial \xi}\right)_t \tag{36}$$

The constitutive equations may now be derived such that $J_G$ and $J_A$ may be expressed by $S_G$ and $S_A$ with a linear relationship. Such derivation may start from the Maxwell Stefan theory, which links the chemical potential gradient to relative velocities between components, as set forth below in Equation (37).

$$\frac{x_i}{RT} \nabla_z \mu_i = -\sum_{j=1}^{N} \frac{x_i x_j (u_i - u_j)}{D_{ij}} \tag{37}$$

where:
$x_i$ is mole fraction of component i;
R is the universal gas constant;
T is the WRT-measured temperature of the reservoir;
$\nabla$ is the gradient operator;
$\mu_i$ is chemical potential of component i;
N is the number of components i; and
D is the Maxwell Stefan diffusion coefficient between components i and j, where $D_{ij} = D_{ji}$.

For systems considered within the scope of the present disclosure, two independent Maxwell Stefan equations for gas and asphaltenes can be written as set forth below in Equations (38)-(41).

$$\frac{x_G}{RT} \nabla_z \mu_G = -\frac{x_G x_A (u_G - u_A)}{D_{GA}} - \frac{x_G x_M (u_G - u_M)}{D_{GM}} \tag{38}$$

$$\frac{x_A}{RT} \nabla_z \mu_A = -\frac{x_A x_G (u_A - u_G)}{D_{GA}} - \frac{x_A x_M (u_A - u_M)}{D_{AM}} \tag{39}$$

$$\nabla_z \mu_G = -RT \frac{\frac{x_A}{x_G} J_G - J_A}{c_t D_{GA}} - RT \frac{\frac{x_M}{x_G} J_G}{c_t D_{GM}} = \tag{40}$$

$$-RTJ_G \left(\frac{\frac{x_A}{x_G}}{c_t D_{GA}} + \frac{\frac{x_M}{x_G}}{c_t D_{GM}}\right) + RT \frac{J_A}{c_t D_{GA}}$$

$$\nabla_z \mu_A = -RT \frac{\frac{x_G}{x_A} J_A - J_G}{c_t D_{GA}} - RT \frac{\frac{x_M}{x_A} J_A}{c_t D_{AM}} = \tag{41}$$

$$RT \frac{J_G}{c_t D_{GA}} - RTJ_A \left(\frac{\frac{x_G}{x_A}}{c_t D_{GA}} + \frac{\frac{x_M}{x_A}}{c_t D_{AM}}\right)$$

With the definition of $J_i$ in Equations (15)-(17) and the relationship of $D_{ij} = D_{ji}$, Equation (42) set forth below may be obtained.

$$\begin{bmatrix} \nabla_z \mu_G \\ \nabla_z \mu_A \end{bmatrix} = \frac{RT}{c_t} \begin{bmatrix} -\frac{x_A}{x_G} \frac{1}{D_{GA}} - \frac{x_M}{x_G} \frac{1}{D_{GM}} & \frac{1}{D_{GA}} \\ \frac{1}{D_{GA}} & -\frac{x_G}{x_A} \frac{1}{D_{GA}} - \frac{x_M}{x_A} \frac{1}{D_{AM}} \end{bmatrix} \tag{42}$$

$$\begin{bmatrix} J_G \\ J_A \end{bmatrix}$$

-continued $$= \frac{RT}{c_t} \begin{bmatrix} -\frac{S_A}{S_G}\frac{1}{D_{GA}} - \frac{1}{S_G}\frac{1}{D_{GM}} & \frac{1}{D_{GA}} \\ \frac{1}{D_{GA}} & -\frac{S_G}{S_A}\frac{1}{D_{GA}} - \frac{1}{S_A}\frac{1}{D_{AM}} \end{bmatrix}$$

$$\begin{bmatrix} J_G \\ J_A \end{bmatrix} \Leftrightarrow \begin{bmatrix} J_G \\ J_A \end{bmatrix}$$

$$= \frac{c_t}{RT} \begin{bmatrix} -\frac{S_A}{S_G}\frac{1}{D_{GA}} - \frac{1}{S_G}\frac{1}{D_{GM}} & \frac{1}{D_{GA}} \\ \frac{1}{D_{GA}} & -\frac{S_G}{S_A}\frac{1}{D_{GA}} - \frac{1}{S_A}\frac{1}{D_{AM}} \end{bmatrix}^{-1}$$

$$C_M \begin{bmatrix} \nabla_\xi \mu_G \\ \nabla_\xi \mu_A \end{bmatrix}$$

$$= c_M^2 (1 + S_A + S_G)$$

$$\begin{bmatrix} -\frac{S_A}{S_G}\frac{1}{D_{GA}} - \frac{1}{S_G}\frac{1}{D_{GM}} & \frac{1}{D_{GA}} \\ \frac{1}{D_{GA}} & -\frac{S_G}{S_A}\frac{1}{D_{GA}} - \frac{1}{S_A}\frac{1}{D_{AM}} \end{bmatrix}^{-1}$$

$$\frac{1}{RT}\begin{bmatrix} \nabla_\xi \mu_G \\ \nabla_\xi \mu_A \end{bmatrix}$$

$$= -c_M^2 \frac{1+S_A+S_G}{D_{AM}S_G+D_{GA}+D_{GM}S_A}$$

$$\begin{bmatrix} D_{GM}S_G(D_{AM}S_G+D_{GA}) & D_{AM}D_{GM}S_A S_G \\ D_{AM}D_{GM}S_A S_G & D_{AM}S_A(D_{GA}+D_{GM}S_A) \end{bmatrix}$$

$$\frac{1}{RT}\begin{bmatrix} \nabla_\xi \mu_G \\ \nabla_\xi \mu_A \end{bmatrix}$$

The flux equations may then be obtained, as set forth below in Equation (43).

$$\begin{bmatrix} J_G \\ J_A \end{bmatrix} = \tag{43}$$

$$\frac{-c_M^2(1+S_A+S_G)}{MS_G+D_{GA}+D_{GM}S_A}\begin{bmatrix} D_{GM}S_G(D_{AM}S_G+D_{GA}) & D_{AM}D_{GM}S_A S_G \\ D_{AM}D_{GM}S_A S_G & D_{AM}S_A(D_{GA}+D_{GM}S_A) \end{bmatrix}$$

$$\frac{1}{RT}\begin{bmatrix} \frac{\partial \mu_G}{\partial S_G} & \frac{\partial \mu_G}{\partial S_A} \\ \frac{\partial \mu_A}{\partial S_G} & \frac{\partial \mu_A}{\partial S_A} \end{bmatrix}\begin{bmatrix} \nabla_\xi S_G \\ \nabla_\xi S_A \end{bmatrix}$$

Based on regular solution theory, the chemical potential of each component i is given by Equation (44) set forth below.

$$\mu_i = \tag{44}$$

$$\mu_i^0 + RT\left\{\ln\frac{x_i \bar{V}_i}{V} + 1 - \frac{\bar{V}_i}{V} + \frac{\bar{V}_i}{RT}\sum_j \sum_k \phi_j \phi_k [(\delta_i - \delta_j)^2 + 2l_{ij}\delta_i\delta_j - 0.5(\delta_j - \delta_k)^2 - l_{jk}\delta_j\delta_k]\right\}$$

where:
$\bar{V}_i$ is the partial molar volume of component i;
$\varphi$ is the volume fraction of component i;
$\delta_i$ is the solubility parameter of component i;
$l_{ij}$ is the binary interaction parameter between components i and j; and
an N component mixture solubility parameter $\delta$ can be determined utilizing Equations (45) and (46) set forth below.

$$\delta = \sum_i \phi_i \delta_i = \frac{\sum_i x_i \bar{V}_i \delta_i}{\sum_j x_j \bar{V}_j} \tag{45}$$

$$V = \Sigma_i x_i \bar{V}_i \tag{46}$$

where:
V is the molar volume of the mixture.

The chemical potential in Equation (44) can also be differentiated with respect to $x_i$. Thus, Equations (47) and (48) set forth below may be obtained.

$$\frac{\partial x_i}{\partial S_j} = \frac{\partial\left(\frac{S_i}{1+\sum_{k=1}^{N-1}S_k}\right)}{\partial S_j} = \frac{\left(1+\sum_{k=1}^{N-1}S_k\right)\Delta_{ij}-S_i}{\left(1+\sum_{k=1}^{N-1}S_k\right)^2} \tag{47}$$

$$\frac{\partial \phi_i}{\partial S_j} = \frac{\partial\left(\frac{\bar{V}_i S_i}{\bar{V}_N+\sum_{k=1}^{N-1}\bar{V}_k S_k}\right)}{\partial S_j} = \frac{\left(\bar{V}_N+\sum_{k=1}^{N-1}\bar{V}_k S_k\right)\bar{V}_j\Delta_{ij}-S_i}{\left(\bar{V}_N+\sum_{k=1}^{N-1}\bar{V}_k S_k\right)^2} \tag{48}$$

where:
$\Delta_{ij}$ is the Kronecker delta.

The models described above can be further simplified by assuming that cross-term diffusion effects can be neglected, as set forth below in Equation (49).

$$\begin{pmatrix} \frac{\partial x_G}{\partial t} \\ \frac{\partial x_A}{\partial t} \end{pmatrix} = \nabla\left[\begin{pmatrix} x_G D_G^{eff} & 0 \\ 0 & x_A D_A^{eff} \end{pmatrix}\frac{1}{RT}\begin{pmatrix} \frac{\partial \mu_G}{\partial x_G} & \frac{\partial \mu_G}{\partial x_A} \\ \frac{\partial \mu_A}{\partial x_G} & \frac{\partial \mu_A}{\partial x_A} \end{pmatrix}\begin{pmatrix} \frac{\partial x_G}{\partial z} \\ \frac{\partial x_A}{\partial z} \end{pmatrix}\right] \tag{49}$$

The initial conditions may be expressed as set forth below in Equation (50).

$$x_i(0,z) = x_i^0, i = G, A \tag{50}$$

The boundary conditions at the bottom of the hydrocarbon column can be expressed as set forth below in Equation (51).

$$\frac{\partial x_i(t,0)}{\partial z} = 0, i = G, A \tag{51}$$

The boundary conditions at the GOC can be expressed as set forth below in Equation (52).

$$\frac{\partial x_i(t, z(t))}{\partial z} = 0, i = G, A \tag{52}$$

The location of the GOC can be approximated as set forth below in Equation (53).

$$Z(t) = Z(0) + \int_0^t \frac{J_G^{GOC}}{C_G^{GOC-O} - C_G^{GOC-G}} dt \tag{53}$$

where:
$J_G^{GOC}$ is the gas mass flux charging into the oil column;
$C_G^{GOC-O}$ is the molar concentration of gas at the GOC on the oil side; and
$C_G^{GOC-G}$ is the molar concentration of gas at the GOC on the gas side.

Accordingly, the density inversion may be determined utilizing Equations (49)-(53), obtained via ones of Equations (1)-(48) or solving ones of Equations (1)-(48) directly. Table 1 lists examples of the inputs. Various ones of the parameters may be estimated (via WRT or otherwise) prior to the actual determination.

TABLE 1

Example Density Inversion Model Inputs and Origins

| Parameter | Example Origin |
| --- | --- |
| Reservoir Pressure $P_{res}$ | WRT |
| Reservoir Temperature $T_{res}$ | WRT |
| Reservoir Fluid Density $\rho$ | WRT |
| Reservoir Fluid Viscosity $\mu$ | WRT |
| Reservoir Fluid Composition | WRT |
| Reservoir Depth | WRT |
| Time | Setting |
| Reservoir Fluid Molecular Size | ACGA |
| $D_{GA}$ | Estimate |
| $D_{GM}$ | Estimate |
| $D_{AM}$ | Estimate |

As described above, the molecular sizes of the fluid components may be estimated via ACGA utilizing data obtained via WRT, such as: density, optical density, a bulk fluid solubility parameter, and molar volume of the fluid obtained via WRT at multiple depths within the reservoir; molar volume, partial density, and a compositional component solubility parameter of at least one of the compositional components of the WRT-obtained fluid at the various depths; and temperature of the reservoir. For example, estimating the molecular sizes utilizing ACGA and the WRT-obtained data may be via Equation (54) set forth below.

$$\frac{OD(h_2)}{OD(h_1)} = \exp\left\{ \frac{v_a g(\rho - \rho_a)(h_2 - h_1)}{RT} + \frac{v_a}{RT}\left[(\delta_a - \delta)^2_{h_1} - (\delta_a - \delta)^2_{h_2}\right] + \left[\left(\frac{v_a}{v}\right)_{h_2} - \left(\frac{v_a}{v}\right)_{h_1}\right]\right\}, \quad (54)$$

where:
$OD(h_1)$ is measured optical density of the WRT-obtained fluid at a first depth $h_1$;
$OD(h_2)$ is measured optical density of the WRT-obtained fluid at a second depth $h_2$;
$v_a$ is estimated molar volume of the asphaltene portion of the fluid contained within the reservoir;
$v$ is estimated molar volume of the fluid contained within the reservoir; and
g is gravitational acceleration.

Figure 3:
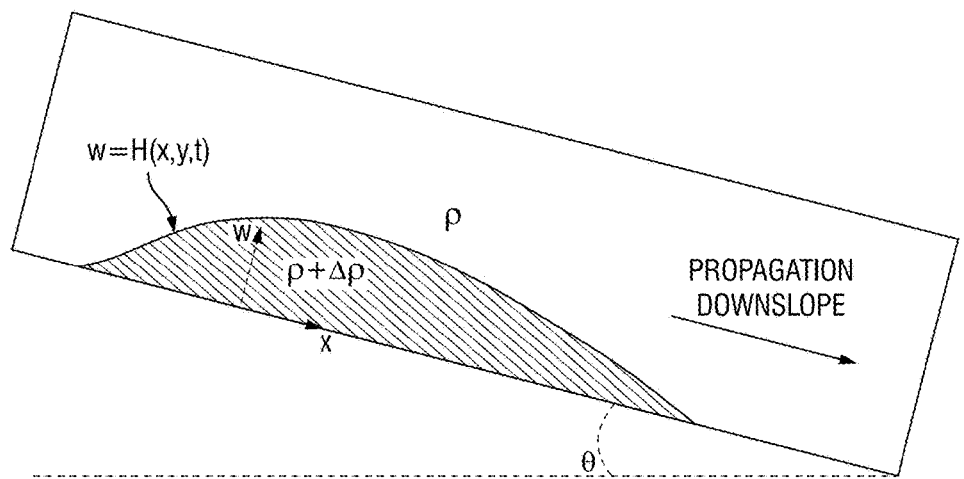
FIG. 3 is a graph demonstrating one or more aspects related to the present disclosure.

From the density inversion model described above, the density inversion amount and its variation with depth and time may be obtained. Subsequently, tar mat formation may be predicted utilizing a gravity current model. The gravity current model may be a two-dimensional (2-D) model describing the gravity current propagation in an inclined porous layer, such as illustrated in the schematic view depicted in FIG. 3.

Combining Darcy's law, the conservation of mass, and the processes of convection and diffusion, the denser fluid can be described as set forth below in Equation (55).

$$\frac{\partial H}{\partial t} = \frac{\Delta \rho g k}{\phi \mu}\left(-\sin\theta \frac{\partial H}{\partial x} + \frac{\cos\theta}{2}\nabla^2 H^2\right) \quad (55)$$

where:
H is height of the gravity current at given location;
$\Delta \rho$ is the density inversion;
k is permeability of the layer;
$\varphi$ is porosity;
$\mu$ is fluid viscosity;
x is distance from the initial influx location; and
$\theta$ is dip angle of the slope.

The first term on the right-hand side of Equation (55) represents the gravity-driven convection downslope, and the second term represents spreading perpendicular to the slope. It is noted that the gravity current downslope velocity may be of more importance relative to velocities in other directions in tar mat studies, because the tar mat formation time is more dependent on the downslope slipping. By simulating the gravity current within geological time, the downslope velocity and the experienced distance of denser fluid in specific time can be determined or estimated.

Figure 4:
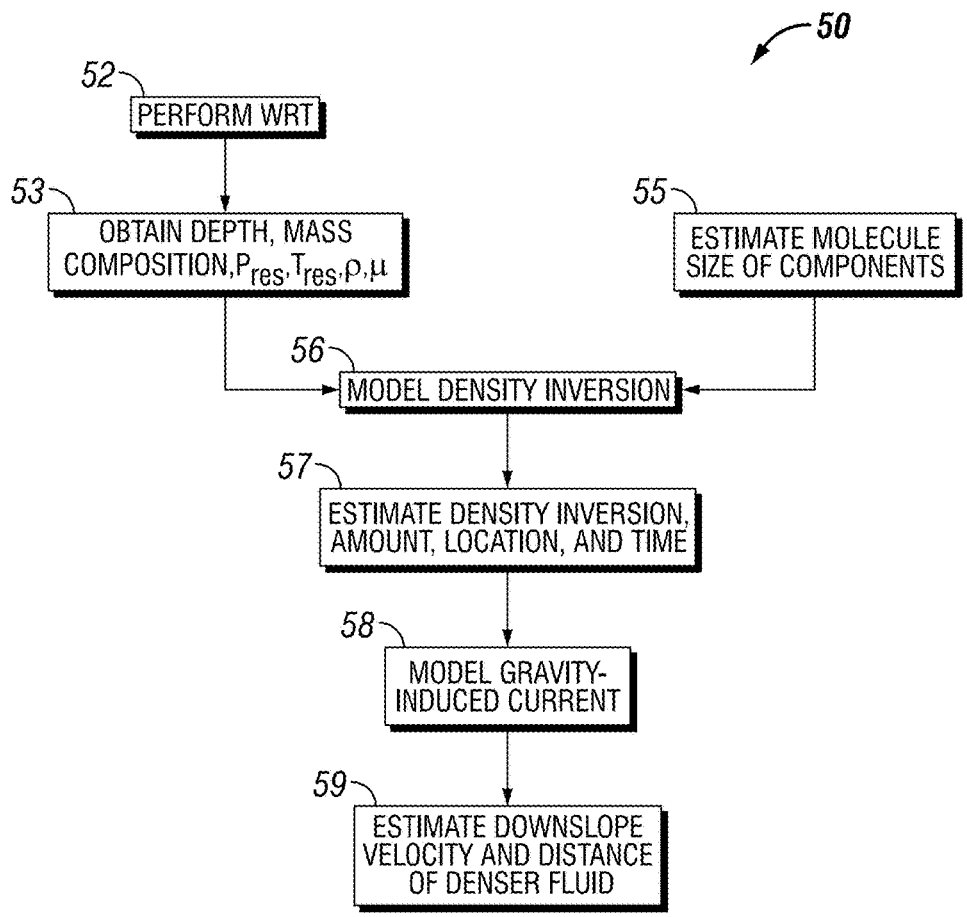
FIG. 4 is a flow-chart diagram of at least a portion of a workflow and/or other method according to one or more aspects of the present disclosure.

FIG. 4 is a flow-chart diagram of at least a portion of an example implementation of a method (50) incorporating the aspects described above. The method (50) may comprise performing (52) WRT, such as may utilize one or more downhole tools having one or more aspects in common with the wireline downhole tools and/or apparatus described below. Performing (52) the WRT may also or instead utilize downhole tools and/or apparatus conveyed downhole via means other than wireline, such as drillstring, coiled tubing, TLC tubing, and/or other conveyance means. The data obtained via performing (52) the WRT and/or other means may be utilized to calculate, estimate, predict, determine, and/or otherwise obtain (53) depth, mass composition, $P_{res}$, $T_{res}$, $\rho$, $\mu$, and/or other parameters and/or characteristics of the reservoir.

The method (50) also comprises estimating (55) the molecule sizes of the components of the fluid contained within the reservoir. As described above, estimating (55) the molecule sizes may utilize ACGA, such as via Equation (54) set forth above.

The obtained (53) reservoir/fluid parameters and the estimated (55) component molecule sizes may then be utilized to generate (56) the density inversion model, such as via utilization of Equations (49)-(53), obtained via ones of Equations (1)-(48) or ones of Equations (1)-(48) directly.

The generated (56) density inversion model may then be utilized to estimate (57) the density inversion amount, location, and elapsed time since forming (e.g., since the start of the late gas charge). This information may then be utilized to model (58) the resulting gravity-induced current, such as via Equation (55) set forth above. The downslope velocity and distance of denser fluid may then be estimated (59) utilizing the gravity-induced current model.

The example method (50) depicted in FIG. 4, and well as other implementations within the scope of the present disclosure, may be utilized to calculate the fluid density inversion and simulate its following transport in a porous medium, and may be applied to explain the real tar mat formation process in subterranean reservoirs. The simulation results, including the density inversion and its downslope velocity and distance, may subsequently be utilized to analyze how likely it is that tar mat has formed, as well as where and when tar mat occurs and its development within geological time. Such information may aid in understanding the tar mat formation history and future process. Additionally, the reservoir conditions that may be likely to result in tar mat can be recognized. Accordingly, drilling and production resources may be utilized more effectively, such as by reducing or avoiding the risk of drilling into and/or completing a tar mat zone.

It is also noted that modeling the density inversion within the scope of the present disclosure is not limited to the example described above. For example, the following description relates to another example implementation for modeling the density inversion within the scope of the present disclosure. One or more aspects of the example implementation described above may also be utilized in combination with one or more aspects of the example implementation described below, among other example implementations also within the scope of the present disclosure.

As with the example described above, the following model is a 1-D, three-component, single-phase model. The reservoir fluid is described as a single fluid phase limited to three components: gas (typically methane and perhaps some other light hydrocarbons); maltenes (live oil components excluding asphaltenes); and asphaltenes. Each component is again represented by G, M, and A, respectively. The original gas in the oil is not explicitly included in the analysis, and may be considered to be included with the maltenes. A preexisting gas cap at the top of the oil reservoir is also not part of this model.

According to the conservation of mass for each component in a unit volume of fluid, the rate of change of concentration in the volume equals the net flux into this volume. As the model is 1-D, the mass conservation equation for each component may be as set forth below in Equation (56).

$$\frac{\partial c_i}{\partial t} = -\frac{\partial J_d}{\partial z} \tag{56}$$

The diffusion flux $J_d$ is described by Fick's first law, as set forth below in Equation (57).

$$J_d = -D\frac{\partial c_i}{\partial z} \tag{57}$$

For asphaltenes, in addition to the diffusion, reducing solubility of asphaltenes in high solution gas oil due to a gas charge is considered, as referred to above as asphaltene expulsion. A proposed numerical value of the solubility parameter δ as $\sqrt{(\Delta H-RT)/v_m}$. The product of the sum of volume fractions and the solubility parameter of each component can estimate the solubility parameter of mixtures. As solution gas concentration increases, the difference in solubility parameter between asphaltenes and the fluid ($\delta_A - \delta_{fluid}$) becomes large, leading to asphaltene expulsion from the fluid phase. In other words, the dissolving capability of the fluid for asphaltenes is weakened as more gas enters the system. The derived FHZ dynamic equation describes the dynamics of a multicomponent mixture under convection, molecular diffusion, solubility effect, and gravity effect. In this case, due to the gas charge, the solubility effect dominates. Therefore, only molecular diffusion and solubility are considered. Accordingly, the asphaltene expulsion flux $J_{e,A}$ may be expressed as set forth below in Equation (58).

$$J_{e,A} = Kc\frac{\partial c_l}{\partial x} \tag{58}$$

The parameter K represents the solubility effects of each component, such as the rate at which gas expels asphaltenes from their original location, and can also be expressed as set forth below in Equation (59).

$$K = \alpha\frac{2V_G V_A(\delta_M - \delta_G)(\delta_A - \delta_M)}{RT} \tag{59}$$

where α is an adjustable constant that accounts for the effects of the compensation of the asphaltene solubility parameter and of stability from asphaltene diffusion. For example, α may be set as 1.

Combining Equations (56)-(59), the transport equations for the three component system in single-phase under a gas charge may be as set forth below in Equations (60)-(62).

$$\frac{\partial c_G}{\partial t} = D_G\frac{\partial^2 c_G}{\partial x^2} \tag{60}$$

$$\frac{\partial c_M}{\partial t} = D_M\frac{\partial^2 c_M}{\partial x^2} \tag{61}$$

$$\frac{\partial c_A}{\partial t} = D_A\frac{\partial^2 c_A}{\partial x^2} + K\left(\frac{\partial c_A}{\partial x}\frac{\partial c_G}{\partial x} + c_A\frac{\partial^2 c_G}{\partial x^2}\right) \tag{62}$$

where D is the effective diffusion coefficient independent of time and depth, as described above.

As above, the initial condition is defined as a homogenous mixture of maltenes and asphaltenes in the oil reservoir without charged gas, as set forth below in Equation (63).

$$c_G(0,x)=0; c_i(0,x)=\text{constant}; i=M,A \tag{63}$$

The charge of gas into the oil is considered to occur at the top of the oil reservoir. It is also assumed that the original homogenous mixture of maltenes and asphaltenes remains in the oil reservoir without leaving the system. Thus, the boundary conditions are as set forth below in Equations (64)-(66).

$$c_G(t,\text{top})=\text{constant} \tag{64}$$

$$\left.\frac{\partial c_i}{\partial x}\right|_{x=top} = 0 \quad i = M, A \tag{65}$$

$$\left.\frac{\partial c_i}{\partial x}\right|_{x=base} = 0 \quad i = G, M, A \tag{66}$$

Figure 5:
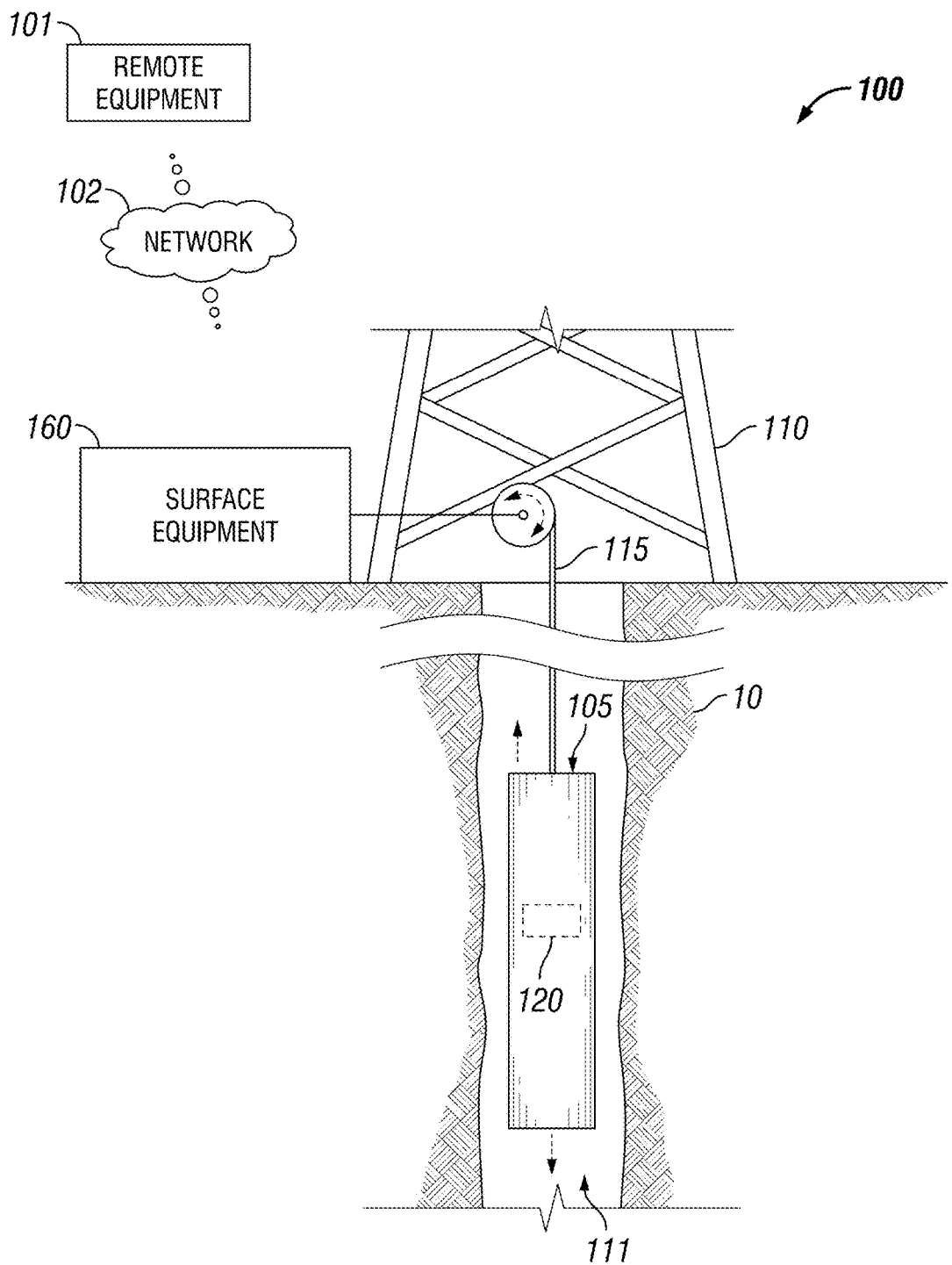
FIG. 5 is a schematic view of at least a portion of apparatus according to one or more aspects of the present disclosure.

FIG. 5 is a schematic view of an example WRT system 100 that may be employed onshore and/or offshore according to one or more aspects of the present disclosure, representing an example environment in which one or more aspects described above may be implemented, such as to perform one or more aspects of the method (50) depicted in FIG. 4 and/or other methods and/or processes within the scope of the present disclosure. As depicted in FIG. 5, a downhole tool 105 may be suspended from a platform, rig, derrick, and/or other wellsite structure 110 in a wellbore 111 formed in one or more subterranean reservoirs 10. The downhole tool 105 may be or comprise one or more tools, one or more of which may be or comprise an acoustic tool, a conveyance tool, a density tool, an electromagnetic (EM) tool, a reservoir evaluation tool (also known in the art as a formation evaluation tool), a magnetic resonance tool, a monitoring tool, a neutron tool, a nuclear tool, a photoelectric factor tool, a porosity tool, a reservoir characterization tool, a resistivity tool, a sampling tool, a seismic tool, a surveying tool, and/or a telemetry tool, although other downhole tools are also within the scope of the present disclosure.

The downhole tool 105 may be deployed from the wellsite structure 110 into the wellbore 111 via a conveyance means 115, which may be or comprise a wireline cable, a slickline cable, and/or coiled tubing, although other means for conveying the downhole tool 105 within the wellbore 111 are also within the scope of the present disclosure. As the downhole tool 105 operates, outputs of various numbers and/or types from the downhole tool 105 and/or components thereof (one of which is designated by reference numeral 120) may be sent via the conveyance means 115 and/or otherwise to a logging and control system and/or other surface equipment 160 at surface, and/or may be stored in various numbers and/or types of memory for subsequent recall and/or processing after the downhole tool 105 is retrieved to surface. Such data may also be transmitted from the surface equipment 160 to remote equipment 101 disposed remote from the WRT system 100, perhaps hundreds or thousands of kilometers away. For example, such transmission may be via one or more networks 102, such as may include one or more of a cellular network, a satellite network, wide area networks, local area networks, and/or other types of networks, including wired and/or wireless networks.

Figure 6:
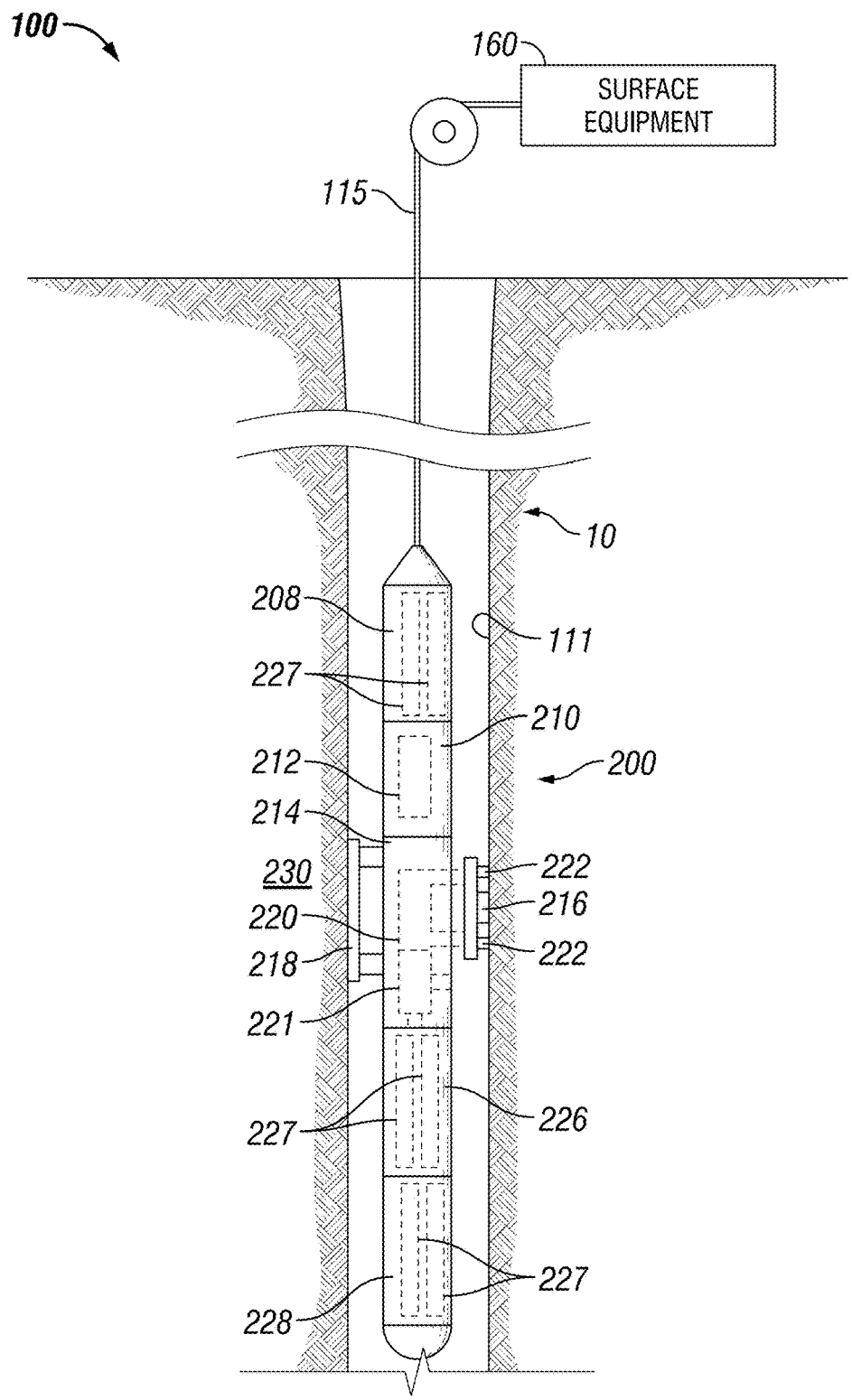
FIG. 6 is a schematic view of at least a portion of apparatus according to one or more aspects of the present disclosure.

FIG. 6 is a schematic view of an example implementation of the WRT system 100 shown in FIG. 5, including an example implementation of the downhole tool 105 that is designated in FIG. 6 by reference numeral 200. The downhole tool 200 is operable to engage a portion of a sidewall of the wellbore 111 penetrating the reservoir 10. The downhole tool 200 may be utilized to perform one or more aspects of the method (50) depicted in FIG. 4 and/or other methods and/or processes within the scope of the present disclosure.

The downhole tool 200 is suspended in the wellbore 111 from a lower end of the conveyance means 115. At the surface, the conveyance means 115 may be communicatively coupled to an electronics and processing system and/or other surface equipment 160. The surface equipment 160 may include a controller having an interface configured to receive commands from a surface operator. The surface equipment 160 may further comprise a processor configured to implement one or more aspects of the methods described herein.

The downhole tool 200 may comprise a telemetry module 210, a reservoir test module 214, and a sample module 226 (among other example implementations of the component 120 depicted in FIG. 5). Although the telemetry module 210 is shown as being implemented separate from the reservoir test module 214, the telemetry module 210 may be implemented in the reservoir test module 214. The downhole tool 200 may also comprise additional components at various locations, such as a module 208 above the telemetry module 210 and/or a module 228 below the sample module 226, which may have varying functionality within the scope of the present disclosure.

The reservoir test module 214 may comprise a selectively extendable probe assembly 216 and a selectively extendable anchoring member 218 that are respectively arranged on opposing sides of the downhole tool 200. The probe assembly 216 may be operable to selectively seal off or isolate selected portions of the sidewall of the wellbore 111. For example, the probe assembly 216 may comprise a sealing pad that may be urged against the sidewall of the wellbore 111 in a sealing manner to prevent movement of fluid into or out of the reservoir 10 other than through the probe assembly 216. The probe assembly 216 may thus be operable to fluidly couple a pump 221 and/or other components of the reservoir tester 214 to the adjacent reservoir 10. Accordingly, the reservoir tester 214 may be utilized to obtain fluid samples from the reservoir 10 by extracting fluid from the reservoir 10 using the pump 221. A fluid sample may thereafter be expelled through a port (not shown) into the wellbore 111, or the sample may be directed to one or more detachable chambers 227 disposed in the sample module 226. In turn, the detachable fluid collecting chambers 227 may receive and retain the reservoir fluid for subsequent testing at surface or a testing facility. The detachable sample chambers 227 may be certified for highway and/or other transportation. The module 208 and/or the module 228 may comprise additional sample chambers 227, which may also be detachable and/or certified for highway and/or other transportation.

The reservoir tester 214 may also be utilized to inject fluid into the reservoir 10 by, for example, pumping the fluid from one or more fluid collecting chambers disposed in the sample module 226 via the pump 221. Moreover, while the downhole tool 200 is depicted as comprising one pump 221, it may also comprise multiple pumps. The pump 221 and/or other pumps of the downhole tool 200 may also comprise a reversible pump operable to pump in two directions (e.g., into and out of the reservoir 10, into and out of the collecting chamber(s) of the sample module 226, etc.).

The probe assembly 216 may comprise one or more sensors 222 adjacent a port of the probe assembly 216, among other possible locations. The sensors 222 may be utilized to determine petrophysical parameters of a portion of the reservoir 10 proximate the probe assembly 216. For example, the sensors 222 may be configured to measure or detect one or more of pressure, temperature, composition, electric resistivity, dielectric constant, magnetic resonance relaxation time, nuclear radiation, and/or combinations thereof, although other types of sensors are also within the scope of the present disclosure.

The reservoir tester 214 may also comprise a fluid sensing unit 220 through which obtained fluid samples may flow, such as to measure properties and/or composition data of the sampled fluid. For example, the fluid sensing unit 220 may comprise one or more of a spectrometer, a fluorescence sensor, an optical fluid analyzer, a density and/or viscosity sensor, and/or a pressure and/or temperature sensor, among others.

The telemetry module 210 and/or another portion of the downhole tool 200 may comprise a downhole controller and/or control system 212 communicatively coupled to the surface equipment 160. The surface equipment 160 and/or the downhole controller and/or control system 212 may be configured to control the probe assembly 216 and/or the extraction of fluid samples from the reservoir 10, such as via the pumping rate of pump 221. The surface equipment 160 and/or the downhole controller and/or control system 212 may be further configured to analyze and/or process data obtained from sensors disposed in the fluid sensing unit 220 and/or the sensors 222, store measurements or processed data, and/or communicate measurements or processed data to surface or another component for subsequent analysis.

Figure 7:
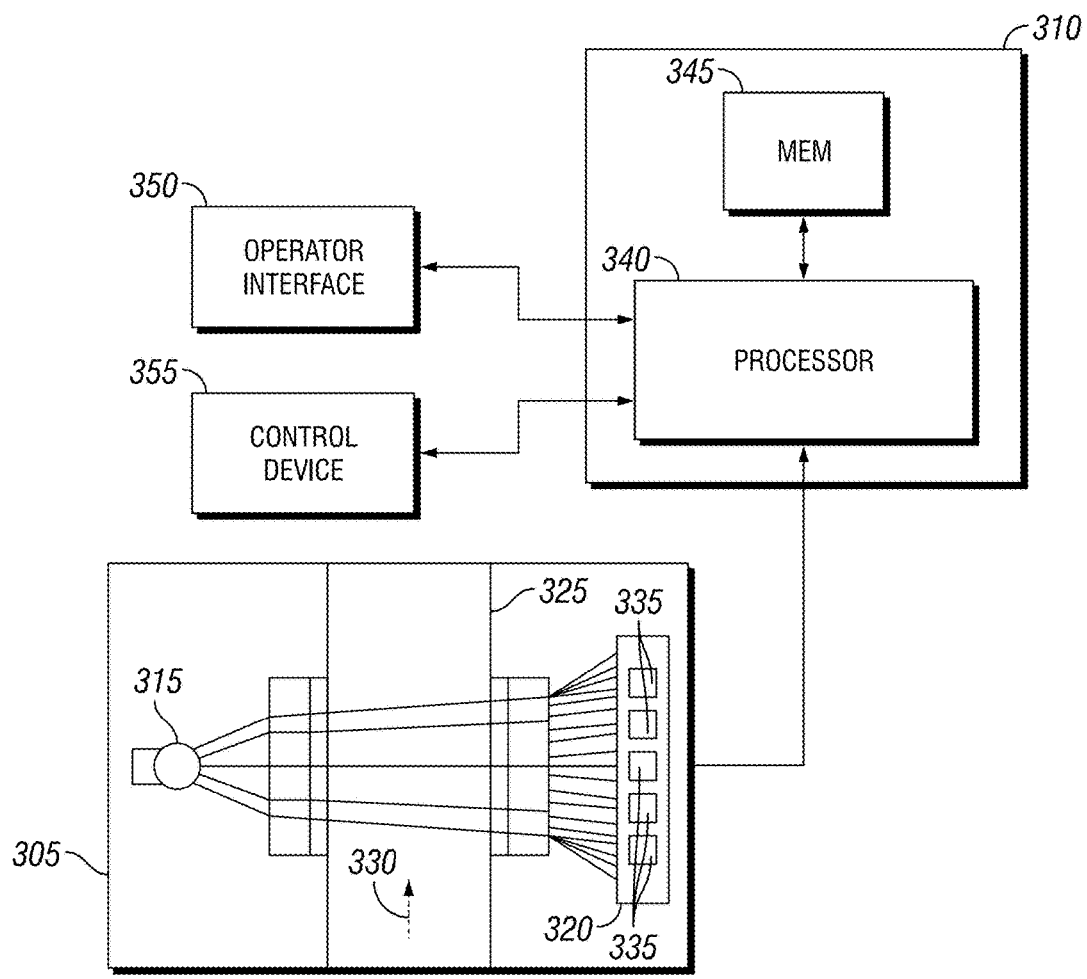
FIG. 7 is a schematic view of at least a portion of apparatus according to one or more aspects of the present disclosure.

FIG. 7 depicts an example implementation of a spectrometer 305 and a control/monitoring system 310 that may form a portion of the downhole tool 100 shown in FIG. 5, the downhole tool 200 shown in FIG. 6, and/or other downhole tools within the scope of the present disclosure, that may be utilized to estimate or determine optical density (OD) and/or other properties of fluid obtained from the reservoir 10. The spectrometer 305 may comprise a light source 315 and a detector 320 disposed on opposite sides of a flowline 325 through which the pumped reservoir fluid flows, as indicated by arrow 330. The spectrometer 305 may be located at various possible locations along the flowline 325 that directs the reservoir fluid through the downhole tool. Although a single light source 315 is depicted in the example shown in FIG. 7, the spectrometer 305 may include additional light sources 315.

The detector 320 senses the light that passes through the reservoir fluid in the flowline 325. The detector 320 may include one or more detector elements 335 that may each be operable to measure the amount of light transmitted at a certain wavelength. For example, the detector elements 335 may detect the light transmitted from the visible to near-infrared within a range of 1, 5, 10, 20, or more different wavelengths ranging between about 400 nm and about 2200 nm. However, other numbers of wavelengths (corresponding to the number of detector elements) and other ranges of wavelengths are also within the scope of the present disclosure. For example, optical characteristics of the reservoir fluid may be detected at a range of wavelengths, such as the near infrared (NIR) wavelength range of approximately 800-2500 nm, 1500-2050 nm, or 1600-1800 nm. Estimations of reservoir fluid properties according to one or more aspects of the present disclosure may utilize optical data collected at a single wavelength, at multiple wavelengths, a range of wavelengths, and/or multiple ranges of wavelengths.

The spectrometer 305 may measure one or more optical characteristics of the reservoir fluid flowing through the flowline 325 and output optical spectra and/or other data representative of the detected optical characteristics. The optical characteristics may include OD of the reservoir fluid at each of the detected wavelengths and/or wavelength ranges. The OD is a logarithmic measurement relating the intensity of light emitted from the light source 315 to the intensity of light detected by the detector 320 at a certain wavelength or range of wavelengths. Each wavelength or wavelength range may correspond to a compositional component of the reservoir fluid. For example, each wavelength or wavelength range may pertain to a corresponding one of $CO_2$, $C1$, $C2$, $C3$, $C4$, $C5$, and $C6+$, although other arrangements are also within the scope of the present disclosure.

The spectrometer 305 may send optical spectra and/or other data representative of the measured optical characteristics to a processor 340 of the control/monitoring system 310. In the context of the present disclosure, the term "processor" refers to any number of processor components. The processor 340 may include a single processor disposed onboard the downhole tool. In other implementations, at least a portion of the processor 340 (e.g., multiple processors collectively operating as the processor 340) may be located within the wellsite surface equipment 160. The processor 340 may also or instead be or include one or more processors located within the downhole tool and connected to one or more processors located in drilling and/or other equipment disposed at the wellsite surface. Moreover, various combinations of processors may be considered part of the processor 340 in the following discussion. Similar terminology is applied with respect to the control/monitoring system 310 as well as a memory 345 of the control/monitoring system 310, meaning that the control/monitoring system 310 may include various processors communicatively coupled to each other and/or various memories at various locations.

The control/monitoring system 310 may estimate or otherwise determine one or more parameters of the reservoir fluid based on the OD data received from the spectrometer 305, a density sensor, a pressure sensor, a temperature sensor, and/or other sensors, and may utilize the parameters to determine density, OD, GOR, mass fractions of compositional components, and/or other properties of the reservoir fluid. To make these and other determinations, the processor 340 may execute instructions stored in the memory 345.

The processor 340 may be communicatively coupled with one or more operator interfaces 350 and/or control devices 355. The operator interface 350 may include logs of predicted and/or measured reservoir fluid properties that are accessible to an operator. The control device 355 may include one or more devices and/or portions thereof that receive control signals for operation based on the estimated properties of the reservoir fluid. Such control devices 355 may implement changes in depth of the downhole tool within the wellbore 111, adjustments to the pumping pressure of the pump(s) of the downhole tool, and/or other control functions, perhaps based on obtained, calculated, and/or estimated reservoir fluid properties.

Figure 8:
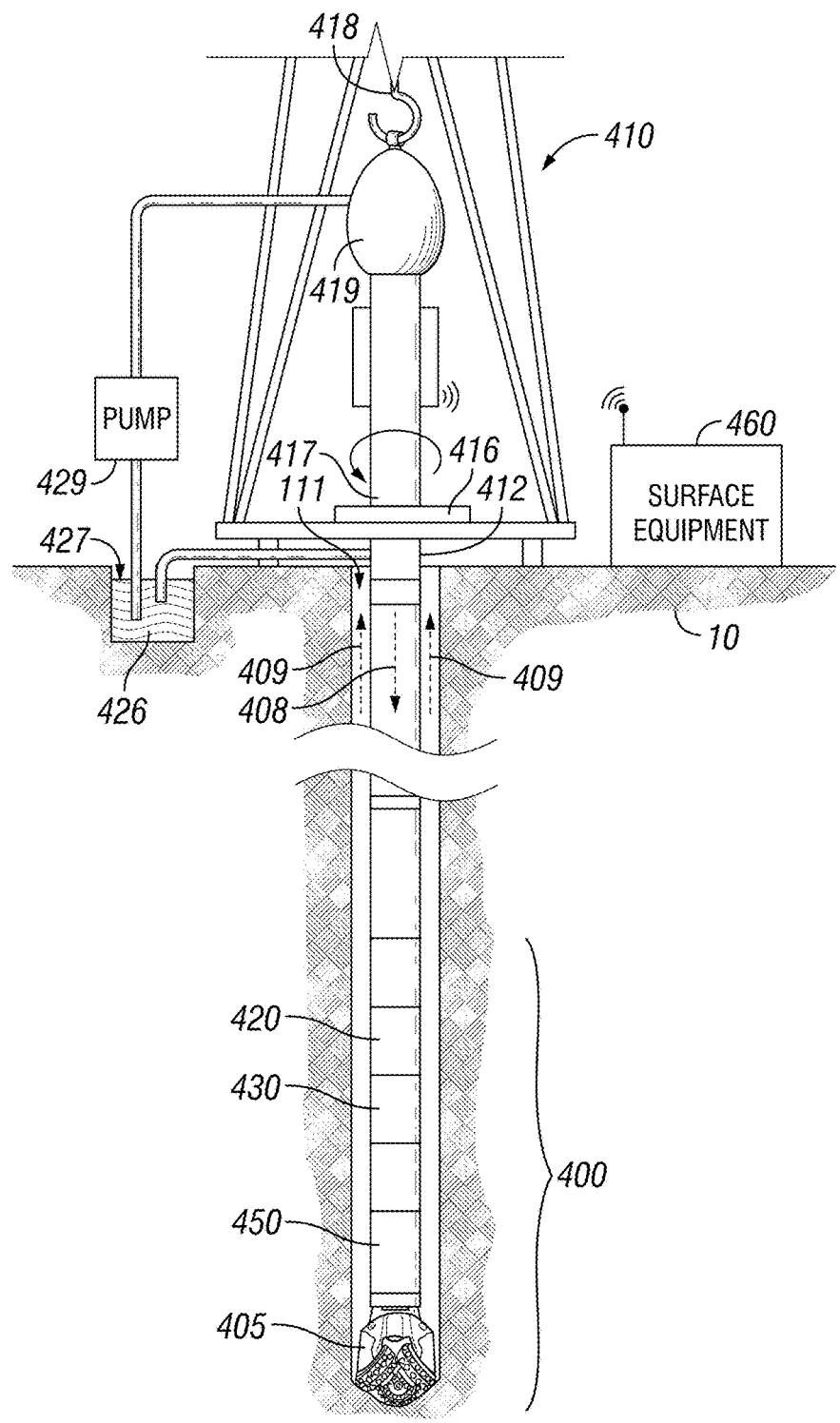
FIG. 8 is a schematic view of at least a portion of apparatus according to one or more aspects of the present disclosure.

FIG. 8 is a schematic view of another example wellsite system that can be employed onshore and/or offshore, perhaps including at the same wellsite as depicted in one or more of the figures described above, where the wellbore 111 may have been formed in the one or more subsurface reservoirs by rotary and/or directional drilling. FIG. 8 represents another example environment in which one or more aspects described above may be implemented, such as to perform one or more aspects of the method (50) depicted in FIG. 4 and/or other methods and/or processes within the scope of the present disclosure.

As depicted in FIG. 8, a conveyance means 412 suspended within the wellbore 111 may comprise or be connected to a bottom hole assembly (BHA) 400, which may have a drill bit 405 at its lower end. The conveyance means 412 may comprise drill pipe, wired drill pipe (WDP), tough logging conditions (TLC) pipe, coiled tubing, and/or other means of conveying the BHA 400 within the wellbore 111.

The surface system at the wellsite may comprise a platform, rig, derrick, and/or other wellsite structure 410 positioned over the wellbore 111. The wellsite structure 410 may be substantially similar or identical to the wellsite structure shown in one or more of the figures described above. The wellsite structure 410 may include a rotary table 416, a kelly 417, a hook 418, and/or a rotary swivel 419. The conveyance means 412 may be rotated by the rotary table 416, energized by means not shown, which may engage the kelly 417 at the upper end of the conveyance means 412. The conveyance means 412 may be suspended from the hook 418, which may be attached to a traveling block (not shown), and through the kelly 417 and the rotary swivel 419, which permits rotation of the conveyance means 412 relative to the hook 418. Additionally, or instead, a top drive system may be used.

The surface system may also include drilling fluid 426, which is commonly referred to in the industry as mud, stored in a pit 427 formed at the wellsite. A pump 429 may deliver the drilling fluid 426 to the interior of the conveyance means 412 via a port (not shown) in the swivel 419, causing the drilling fluid to flow downwardly through the conveyance means 412, as indicated by directional arrow 408. The drilling fluid 426 may exit the conveyance means 412 via ports in the drill bit 405, and then circulate upwardly through the annulus region between the outside of the conveyance means 412 and the wall of the wellbore 111, as indicated by directional arrows 409. The drilling fluid 426 may be used to lubricate the drill bit 405 and/or carry cuttings up to the surface as it is returned to the pit 427 for recirculation. Although not pictured, one or more other circulation implementations are also within the scope of the present disclosure, such as a reverse circulation implementation in which the drilling fluid 426 is pumped down the annulus region (i.e., opposite to directional arrows 409) to return to the surface within the interior of the conveyance means 412 (i.e., opposite to directional arrow 408).

The BHA 400 may include various numbers and/or types of downhole tools, schematically depicted in FIG. 8 as downhole tools 420, 430, and 450. One or more of the downhole tools 420, 430, and 450 may be or comprise an acoustic tool, a density tool, a directional drilling tool, a drilling tool, an EM tool, a formation evaluation tool, a gravity tool, a logging while drilling (LWD) tool, a magnetic resonance tool, a measurement while drilling (MWD) tool, a monitoring tool, a neutron tool, a nuclear tool, a photoelectric factor tool, a porosity tool, a reservoir characterization tool, a resistivity tool, a sampling tool, a seismic tool, a surveying tool, a telemetry tool, and/or a tough logging condition (TLC) tool, although other downhole tools are also within the scope of the present disclosure. One or more of the downhole tools 420, 430, and 450 may be utilized to perform at least a portion of a method according to one or more aspects of the present disclosure, perhaps including at least a portion of an implementation of the method (50) shown in FIG. 4.

The downhole tools 420, 430, and/or 450 may be housed in a special type of drill collar, as it is known in the art, and may include capabilities for measuring, processing, and/or storing information, as well as for communicating with the other downhole tools 420, 430, and/or 450, and/or directly with a logging and control system and/or other surface equipment 460. Such communication may utilize one or more conventional and/or future-developed two-way telemetry systems, such as may be or comprise a mud-pulse telemetry system, a wired drill pipe telemetry system, an electromagnetic telemetry system, and/or an acoustic telemetry system, among others within the scope of the present disclosure. One or more of the downhole tools 420, 430, and/or 450 may also comprise an apparatus (not shown) for generating electrical power for use by the BHA 400. Example devices to generate electrical power include, but are not limited to, a battery system and a mud turbine generator powered by the flow of the drilling fluid.

Figure 9:
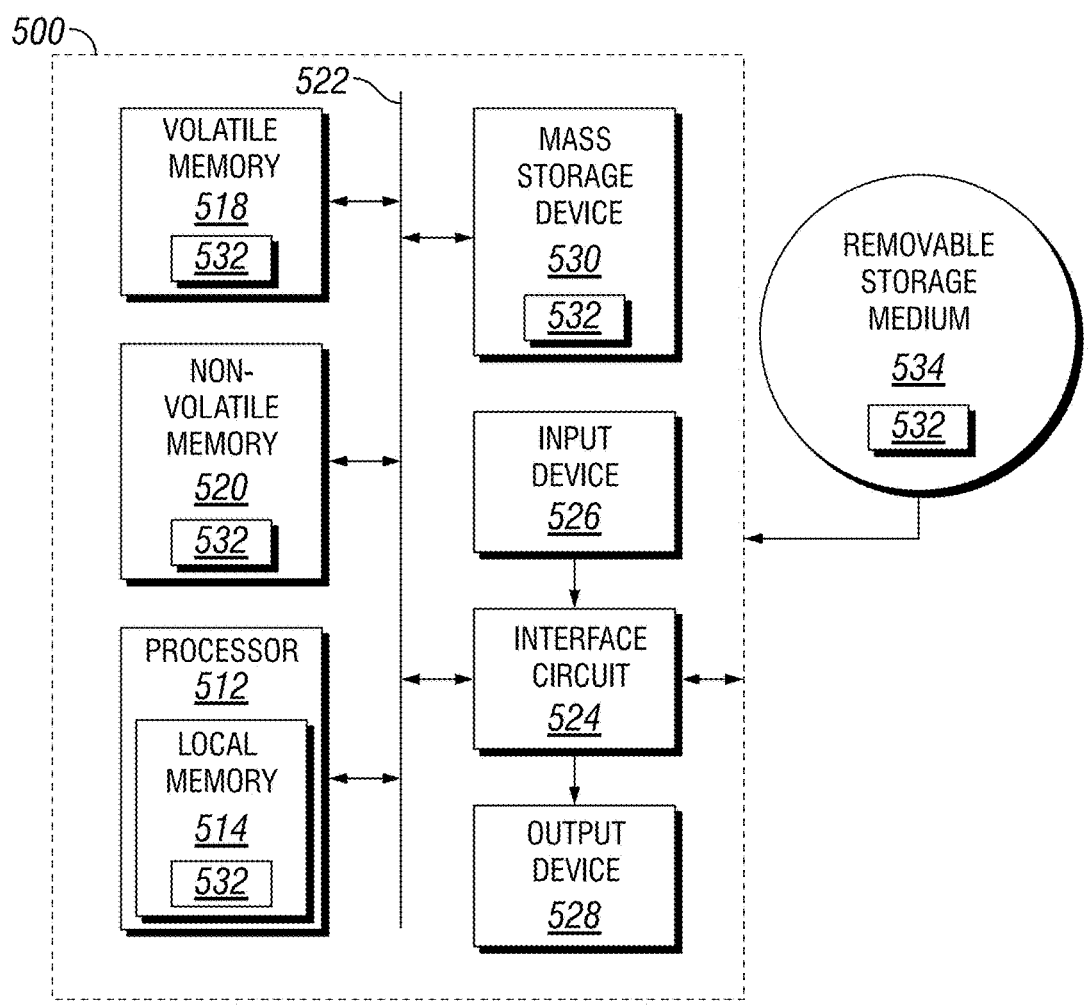
FIG. 9 is a schematic view of at least a portion of apparatus according to one or more aspects of the present disclosure.

FIG. 9 is a schematic view of at least a portion of apparatus according to one or more aspects of the present disclosure. The apparatus is or comprises a processing system 500 that may execute example machine-readable instructions to implement at least a portion of one or more of the methods and/or processes described herein, and/or to implement a portion of one or more of the example downhole tools, surface equipment, and/or remote equipment described herein, including to perform one or more aspects of the method (50) depicted in FIG. 4 and/or other methods and/or processes within the scope of the present disclosure. For example, the downhole tools 105, 200, 420, 430, and/or 450 shown in FIGS. 5, 6, and 8 may each comprise a corresponding instance of the processing system 500 or a subset of the components of the processing system 500 described below. The remote equipment 101 shown in FIG. 5, the surface equipment 160 shown in FIGS. 5 and 6, the control/monitoring system 310 shown in FIG. 7, and/or the surface equipment 460 shown in FIG. 8 may also each be or comprise a corresponding instance of the processing system 500 or a subset of the components thereof. The processing system 500 may be or comprise, for example, one or more processors, controllers, special-purpose computing devices, servers, personal computers, personal digital assistant ("PDA") devices, smartphones, internet appliances, and/or other types of computing devices.

The processing system 500 may comprise a processor 512 such as, for example, a general-purpose programmable processor. The processor 512 may comprise a local memory 514, and may execute coded instructions 532 present in the local memory 514 and/or another memory device. The processor 512 may execute, among other things, machine-readable instructions or programs to implement the methods and/or processes described herein. The programs stored in the local memory 514 may include program instructions or computer program code that, when executed by an associated processor, enable the downhole tools 105, 200, 420, 430, and/or 450, the remote equipment 101, the surface equipment 160, the control/monitoring system 310, and/or the surface equipment 460 to perform tasks as described herein. The processor 512 may be, comprise, or be implemented by one or a plurality of processors of various types suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples. Of course, other processors from other families are also appropriate.

The processor 512 may be in communication with a main memory, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 520 may be, comprise, or be implemented by read only memory, flash memory, and/or other types of memory devices. One or more memory controllers (not shown) may control access to the volatile memory 518 and/or the non-volatile memory 520.

The processing system 500 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, and/or a cellular interface, among others. The interface circuit 524 may also comprise a graphics driver card. The interface circuit 524 may also comprise a communication device, such as a modem or network interface card, to facilitate exchange of data with external computing devices via a network (e.g., Ethernet connection, digital subscriber line ("DSL"), telephone line, coaxial cable, cellular telephone system, satellite, etc.).

One or more input devices 526 may be connected to the interface circuit 524. The input device(s) 526 may permit a user to enter data and commands into the processor 512. The input device(s) 526 may be, comprise, or be implemented by, for example, a keyboard, a mouse, a touchscreen, a track-pad, a trackball, an isopoint, and/or a voice recognition system, among others.

One or more output devices 528 may also be connected to the interface circuit 524. The output devices 528 may be, comprise, or be implemented by, for example, display devices (e.g., a liquid crystal display or cathode ray tube display (CRT), among others), printers, and/or speakers, among others.

The processing system 500 may also comprise one or more mass storage devices 530 for storing machine-readable instructions and data. Examples of such mass storage devices 530 include floppy disk drives, hard drive disks, compact disk (CD) drives, and digital versatile disk (DVD) drives, among others. The coded instructions 532 may be stored in the mass storage device 530, the volatile memory 518, the non-volatile memory 520, the local memory 514, and/or on a removable storage medium 534, such as a CD or DVD. Thus, the modules and/or other components of the processing system 500 may be implemented in accordance with hardware (embodied in one or more chips including an integrated circuit such as an application specific integrated circuit), or may be implemented as software or firmware for execution by a processor. In particular, in the case of firmware or software, the implementation may be provided as a computer program product including a computer readable medium or storage structure embodying computer program code (i.e., software or firmware) thereon for execution by the processor.

Figure 10:
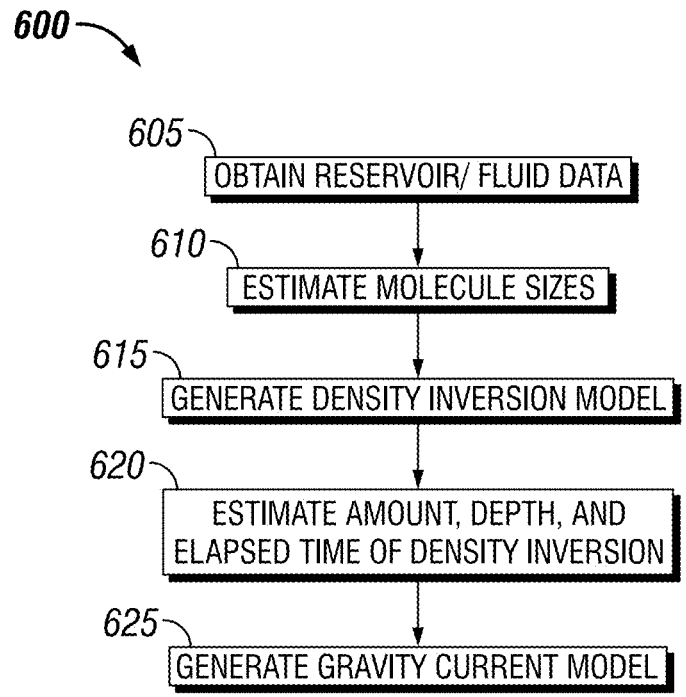
FIG. 10 is a flow-chart diagram of at least a portion of a method according to one or more aspects of the present disclosure.

FIG. 10 is a flow-chart diagram of at least a portion of a method (600) according to one or more aspects of the present disclosure. The method (600) may be performed via operation of at least one of a downhole tool, surface equipment, remote equipment, and/or a combination thereof, perhaps including one or more instances of at least a portion of the processing system 500 shown in FIG. 9. The downhole tool may be the downhole tool 105 shown in FIG. 5, the downhole tool 200 shown in FIG. 6, one or more of the downhole tools 420, 430 and 450 shown in FIG. 8, and/or other downhole tools described herein or otherwise within the scope of the present disclosure. The surface equipment may be the surface equipment 160 shown in FIGS. 5 and 6, the surface equipment 460 shown in FIG. 8, and/or other surface equipment within the scope of the present disclosure. The remote equipment may be the remote equipment 101 shown in FIG. 5 and/or other remote equipment within the scope of the present disclosure.

The method (600) includes obtaining (605) data associated with at least one of a subterranean hydrocarbon reservoir, fluid contained within the reservoir, fluid obtained from the reservoir by the downhole tool, and/or a combination thereof. For example, the obtained (605) data may include the example data listed above in Table 1.

Molecular sizes of each of a plurality of compositional components of the fluid contained within the reservoir are then estimated (610) based on the obtained (605) data. For example, the molecular sizes may be estimated (610) utilizing ACGA, and the obtained (605) data utilized with the ACGA to estimate (610) the molecular sizes may include: density, optical density, a bulk fluid solubility parameter, and molar volume of the fluid obtained from the reservoir at each of a plurality of depths beneath the wellsite surface; molar volume, partial density, and a compositional component solubility parameter of at least one of the plurality of compositional components at each of the plurality of depths; and temperature of the reservoir. Estimating (610) the molecular sizes utilizing ACGA may utilize Equation (54) set forth above.

A model of a density inversion of the fluid contained within the reservoir is then generated (615) based on the obtained (605) data and the estimated (610) molecular sizes. The generated (615) density inversion model may assume the fluid contained in the reservoir consists of gas transported deeper into the reservoir via diffusion, maltenes transported deeper into the reservoir via diffusion, and asphaltenes transported deeper into the reservoir via diffusion and expulsion by transported methane. For example, the generated (615) density inversion model may be described by Equations (49)-(53) set forth above, utilizing ones of Equations (1)-(48), or using ones of Equations (1)-(48) directly, among other examples within the scope of the present disclosure.

The method (600) may also comprise utilizing the generated (615) density inversion model to estimate (620) an amount of the density inversion, a depth of the density inversion beneath the wellsite and/or relative to the top of the reservoir, and/or a period of time that has elapsed since the density inversion began to form within the reservoir. The method (600) may also comprise generating (625) a model of a gravity-induced current of the density inversion based on the obtained (605) data and the estimated (620) density inversion amount, depth, and elapsed time. For example, the generated (625) gravity current model may be described by Equation (67) set forth below.

$$U_c = \frac{\Delta \rho g k}{\phi \mu} \quad (67)$$

where:
$U_c$ is the characteristic gravity current velocity;
$\Delta \rho$ is the amount of density inversion;
g is gravitational acceleration;
k is estimated permeability of the reservoir;
$\phi$ is estimated porosity of the reservoir; and
$\mu$ is measured viscosity of fluid obtained from the reservoir.

However, the generated (625) gravity current model may instead be described by Equation (55) set forth above to account for propagation of the density inversion along a sloped lower boundary of the reservoir.

Figure 11:
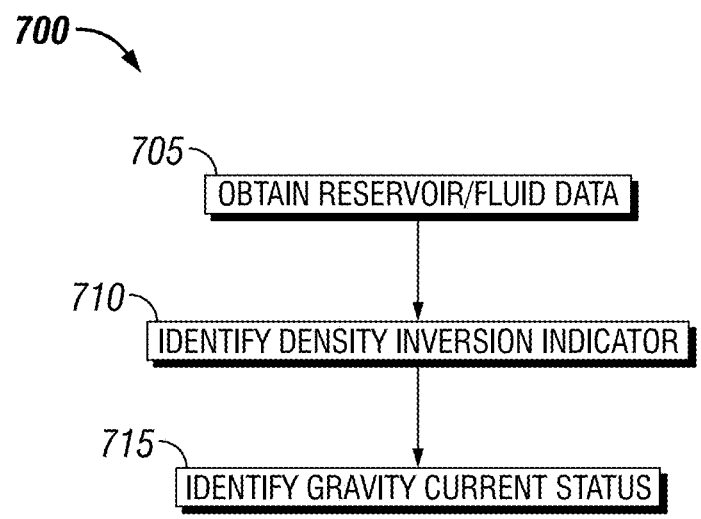
FIG. 11 is a flow-chart diagram of at least a portion of a method according to one or more aspects of the present disclosure.

FIG. 11 is a flow-chart diagram of at least a portion of a method (700) according to one or more aspects of the present disclosure. The method (700) may be performed via operation of at least one of a downhole tool, surface equipment, remote equipment, and/or a combination thereof, perhaps including one or more instances of at least a portion of the processing system 500 shown in FIG. 9. The downhole tool may be the downhole tool 105 shown in FIG. 5, the downhole tool 200 shown in FIG. 6, one or more of the downhole tools 420, 430 and 450 shown in FIG. 8, and/or other downhole tools described herein or otherwise within the scope of the present disclosure. The surface equipment may be the surface equipment 160 shown in FIGS. 5 and 6, the surface equipment 460 shown in FIG. 8, and/or other surface equipment within the scope of the present disclosure. The remote equipment may be the remote equipment 101 shown in FIG. 5 and/or other remote equipment within the scope of the present disclosure. At least a portion of the method (700) may also be performed in conjunction with at least a portion of the method (600) shown in FIG. 10.

The method (700) includes obtaining (705) data associated with at least one of a subterranean hydrocarbon reservoir, fluid contained within the reservoir, fluid obtained from the reservoir by the downhole tool, and/or a combination thereof. For example, the obtained (705) data may include the example data listed above in Table 1.

The method (700) also includes identifying (710) at least one condition indicating that a density inversion exists in the fluid contained in the reservoir. For example, the fluid obtained from the reservoir may be via operation of the downhole tool at each of a plurality of depths within the reservoir beneath the wellsite, and the obtained (705) data may include GOR data related to the fluid obtained at each of the plurality of depths. In such implementations, the at least one identified (710) condition may be a disequilibrium gradient of GOR relative to depth within the reservoir beneath the wellsite, as determined based on the GOR data at each of the plurality of depths.

In another example, the fluid obtained from the reservoir may again be via operation of the downhole tool at each of a plurality of depths within the reservoir beneath the wellsite, but the obtained (705) data may include composition data related to the fluid obtained at each of the plurality of depths, such as a mass concentration of asphaltenes at each of the plurality of depths. In such implementations, the at least one identified (710) condition may be an accumulation of asphaltenes proximate a lower base of the reservoir, as determined based on the composition data at each of the plurality of depths.

In another example, the fluid obtained from the reservoir may again be via operation of the downhole tool at each of a plurality of depths within the reservoir beneath the wellsite, and the obtained (705) data may include both GOR and composition data related to the fluid obtained at each of the plurality of depths. Accordingly, the at least one identified (710) condition includes at least one of: a first condition in which there exists a disequilibrium gradient of GOR relative to depth within the reservoir beneath the wellsite, as determined based on the GOR data at each of the plurality of depths; and a second condition in which there exists an accumulation of asphaltenes proximate a lower base of the reservoir, as determined based on the composition data at each of the plurality of depths. In such implementations, the method (700) may also comprise identifying (715) a current status of a gravity-induced current of asphaltenes towards the lower base of the reservoir as a result of the formation of the density inversion. For example, if both the first and second conditions exist, then identifying (715) the current status of the gravity current may include identifying that the density inversion is presently causing an ongoing, gravity-induced current of asphaltenes towards the lower base of the reservoir. However, if the second condition exists, but the first condition does not exist, then identifying (715) the current status of the gravity current may include identifying that the density inversion previously caused a now-substantially-completed, gravity-induced current of asphaltenes towards the lower base of the reservoir.

In view of the entirety of the present disclosure, including the claims and the figures, a person having ordinary skill in the art will readily appreciate that the present disclosure introduces a system comprising: a downhole tool operable within a wellbore extending from a wellsite surface into a subterranean hydrocarbon reservoir, wherein the downhole tool is operable to obtain fluid from the reservoir and data associated with the obtained fluid; and an apparatus operable to identify at least one condition indicating that a density inversion exists in the fluid contained in the reservoir based on the obtained data.

The downhole tool may be operable to obtain the fluid from the reservoir at each of a plurality of depths within the reservoir, the obtained data may include GOR data related to the fluid obtained at each of the plurality of depths, and the at least one condition may be a disequilibrium gradient of GOR relative to depth within the reservoir, as determined based on the GOR data at each of the plurality of depths.

The downhole tool may be operable to obtain the fluid from the reservoir at each of a plurality of depths within the reservoir, the obtained data may include composition data related to the fluid obtained at each of the plurality of depths, and the at least one condition may be an accumulation of asphaltenes proximate a lower base of the reservoir, as determined based on the composition data at each of the plurality of depths.

The downhole tool may be operable to obtain the fluid from the reservoir at each of a plurality of depths within the reservoir, the obtained data may include GOR and composition data related to the fluid obtained at each of the plurality of depths, and the at least one condition may include at least one of: a first condition in which there exists a disequilibrium gradient of GOR relative to depth within the reservoir, as determined based on the GOR data at each of the plurality of depths; and a second condition in which there exists an accumulation of asphaltenes proximate a lower base of the reservoir, as determined based on the composition data at each of the plurality of depths. In such implementations, among others within the scope of the present disclosure, the apparatus may be further operable to (a) identify, based on the existence of both of the first and second conditions, that the density inversion is causing an ongoing, gravity-induced current of asphaltenes towards the lower base of the reservoir; (b) to identify, based on the existence of the second condition and the absence of the first condition, that the density inversion previously caused a now-substantially-completed, gravity-induced current of asphaltenes towards the lower base of the reservoir; or (c) identify, based on the existence of both of the first and second conditions, that the density inversion is causing an ongoing, gravity-induced current of asphaltenes towards the lower base of the reservoir; and identify, based on the existence of the second condition and the absence of the first condition, that the density inversion previously caused a now-substantially-completed, gravity-induced current of asphaltenes towards the lower base of the reservoir.

The apparatus may be further operable to: estimate molecular sizes of each of a plurality of compositional components of the fluid contained within the reservoir; and generate a model of the density inversion of the fluid contained within the reservoir based on the obtained data and the estimated molecular sizes. In such implementations, among others within the scope of the present disclosure, the apparatus may be further operable to, based on the generated density inversion model, estimate an amount of the density inversion, a depth of the density inversion, and a period of time elapsed since the density inversion began to form within the reservoir. The apparatus may be further operable to generate a model of a gravity-induced current of the density inversion based on the obtained data and the estimated density inversion amount, depth, and elapsed time. The apparatus may be operable to estimate the molecular sizes utilizing an asphaltene concentration gradient analysis (ACGA) and the obtained data. For example, the obtained data utilized with the ACGA to estimate the molecular sizes may include: each of density, optical density, a bulk fluid solubility parameter, and molar volume of the fluid obtained from the reservoir at each of a plurality of depths within the reservoir; each of molar volume, partial density, and a compositional component solubility parameter of at least one of the plurality of compositional components at each of the plurality of depths; and temperature of the reservoir. The generated density inversion model may assume the fluid contained in the reservoir consists of: gas transported deeper into the reservoir via diffusion; maltenes transported deeper into the reservoir via diffusion; and asphaltenes transported deeper into the reservoir via diffusion and expulsion by transported gas.

Inputs for the density inversion model may include: pressure of the reservoir; temperature of the reservoir; density of the fluid contained in the reservoir; viscosity of the fluid contained in the reservoir; composition of the fluid contained in the reservoir; depth within the reservoir; time; the estimated molecular sizes; a diffusion coefficient DGA between gas and asphaltene components of the fluid contained in the reservoir; a diffusion coefficient DGM between gas and maltene components of the fluid contained in the reservoir; and a diffusion coefficient DAM between asphaltene and maltene components of the fluid contained in the reservoir. The downhole tool may be operable to obtain ones of the density inversion model inputs, including: the pressure of the reservoir; the temperature of the reservoir; the density of the fluid contained in the reservoir; the viscosity of the fluid contained in the reservoir; and the composition of the fluid contained in the reservoir.

The present disclosure also introduces a system comprising: (a) a downhole tool operable to obtain: (i) fluid from a subterranean reservoir at each of a plurality of depths within the reservoir; and (ii) data associated with the obtained fluid, including gas-oil ratio (GOR) and composition data related to the fluid obtained at each of the plurality of depths; and (b) an apparatus operable to identify at least one condition indicating that a density inversion exists in the fluid contained in the reservoir based on the obtained data, wherein the at least one condition includes at least one of: (i) a first condition in which there exists a disequilibrium gradient of GOR relative to depth within the reservoir, as determined based on the GOR data at each of the plurality of depths; and (ii) a second condition in which there exists an accumulation of asphaltenes proximate a lower base of the reservoir, as determined based on the composition data at each of the plurality of depths.

The apparatus may be further operable to: identify, based on the existence of both of the first and second conditions, that the density inversion is causing an ongoing, gravity-induced current of asphaltenes towards the lower base of the reservoir; and identify, based on the existence of the second condition and the absence of the first condition, that the density inversion previously caused a now-substantially-completed, gravity-induced current of asphaltenes towards the lower base of the reservoir.

The apparatus may be further operable to: estimate molecular sizes of each of a plurality of compositional components of the fluid contained within the reservoir; generate a model of the density inversion of the fluid contained within the reservoir based on the obtained data and the estimated molecular sizes, wherein the generated density inversion model may assume the fluid contained in the reservoir consists of gas, maltenes, and asphaltenes; and based on the generated density inversion model, estimate an amount of the density inversion, a depth of the density inversion, and a period of time elapsed since the density inversion began to form within the reservoir. The apparatus may be further operable to generate a model of a gravity-induced current of the density inversion based on the obtained data and the estimated density inversion amount, depth, and elapsed time.

The present disclosure also introduces a method comprising: (1) operating a downhole tool to obtain: (a) fluid from a subterranean reservoir at each of a plurality of depths within the reservoir; and (b) data associated with the obtained fluid, including gas-oil ratio (GOR) and composition data related to the fluid obtained at each of the plurality of depths; and (2) operating an apparatus comprising a processor and a memory including computer program code, including to: (a) identify at least one condition indicating that a density inversion exists in the fluid contained in the reservoir based on the obtained data, wherein the at least one condition includes at least one of: (i) first condition in which there exists a disequilibrium gradient of GOR relative to depth within the reservoir, as determined based on the GOR data at each of the plurality of depths; and (ii) a second condition in which there exists an accumulation of asphaltenes proximate a lower base of the reservoir, as determined based on the composition data at each of the plurality of depths; (b) identify, based on the existence of both of the first and second conditions, whether the density inversion is causing an ongoing, gravity-induced current of asphaltenes towards the lower base of the reservoir; (c) identify, based on the existence of the second condition and the absence of the first condition, whether the density inversion previously caused a now-substantially-completed, gravity-induced current of asphaltenes towards the lower base of the reservoir; (d) estimate molecular sizes of each of a plurality of compositional components of the fluid contained within the reservoir utilizing an asphaltene concentration gradient analysis (ACGA) and the obtained data; (e) generate a model of the density inversion of the fluid contained within the reservoir based on the obtained data and the estimated molecular sizes, wherein the generated density inversion model assumes the fluid contained in the reservoir consists of gas, maltenes, and asphaltenes; (f) based on the generated density inversion model, estimate an amount of the density inversion, a depth of the density inversion, and a period of time elapsed since the density inversion began to form within the reservoir; and (g) generate a model of a gravity-induced current of the density inversion based on the obtained data and the estimated density inversion amount, depth, and elapsed time.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:
1. A system comprising:
  a downhole tool operable within a wellbore extending from a wellsite surface into a subterranean hydrocarbon reservoir, wherein the downhole tool is operable to obtain fluid from the reservoir and data associated with the obtained fluid; and
  an apparatus operable to identify at least one condition indicating that a density inversion exists in the fluid contained in the reservoir based on the obtained data, wherein the apparatus is operable to:

estimate molecular sizes of each of a plurality of compositional components of the fluid contained within the reservoir; and generate a model of the density inversion of the fluid contained within the reservoir based at least in part on the obtained data and the estimated molecular sizes, wherein inputs for the density inversion model include one or more diffusion coefficients related to gas, maltene, asphaltene, or any combination thereof.

2. The system of claim 1 wherein:
the downhole tool is operable to obtain the fluid from the reservoir at each of a plurality of depths within the reservoir;
the obtained data includes gas-oil ratio (GOR) data related to the fluid obtained at each of the plurality of depths; and
the at least one condition is a disequilibrium gradient of GOR relative to depth within the reservoir, as determined based on the GOR data at each of the plurality of depths.

3. The system of claim 1 wherein:
the downhole tool is operable to obtain the fluid from the reservoir at each of a plurality of depths within the reservoir;
the obtained data includes composition data related to the fluid obtained at each of the plurality of depths; and
the at least one condition is an accumulation of asphaltenes proximate a lower base of the reservoir, as determined based on the composition data at each of the plurality of depths.

4. The system of claim 1 wherein:
the downhole tool is operable to obtain the fluid from the reservoir at each of a plurality of depths within the reservoir;
the obtained data includes gas-oil ratio (GOR) and composition data related to the fluid obtained at each of the plurality of depths; and
the at least one condition includes at least one of:
a first condition in which there exists a disequilibrium gradient of GOR relative to depth within the reservoir, as determined based on the GOR data at each of the plurality of depths; and
a second condition in which there exists an accumulation of asphaltenes proximate a lower base of the reservoir, as determined based on the composition data at each of the plurality of depths.

5. The system of claim 4 wherein the apparatus is further operable to identify, based on the existence of both of the first and second conditions, that the density inversion is causing an ongoing, gravity-induced current of asphaltenes towards the lower base of the reservoir.

6. The system of claim 4 wherein the apparatus is further operable to identify, based on the existence of the second condition and the absence of the first condition, that the density inversion previously caused a now-substantially-completed, gravity-induced current of asphaltenes towards the lower base of the reservoir.

7. The system of claim 4 wherein the apparatus is further operable to:
identify, based on the existence of both of the first and second conditions, that the density inversion is causing an ongoing, gravity-induced current of asphaltenes towards the lower base of the reservoir; and
identify, based on the existence of the second condition and the absence of the first condition, that the density inversion previously caused a now-substantially-completed, gravity-induced current of asphaltenes towards the lower base of the reservoir.

8. The system of claim 1 wherein the apparatus is further operable to estimate, based on the generated density inversion model, an amount of the density inversion, a depth of the density inversion, and a period of time elapsed since the density inversion began to form within the reservoir.

9. The system of claim 8 wherein the apparatus is further operable to generate a model of a gravity-induced current of the density inversion based on the obtained data and the estimated density inversion amount, depth, and elapsed time.

10. The system of claim 1 wherein the apparatus is operable to estimate the molecular sizes utilizing an asphaltene concentration gradient analysis (ACGA) and the obtained data.

11. The system of claim 10 wherein the obtained data utilized with the ACGA to estimate the molecular sizes includes:
each of density, optical density, a bulk fluid solubility parameter, and molar volume of the fluid obtained from the reservoir at each of a plurality of depths within the reservoir;
each of molar volume, partial density, and a compositional component solubility parameter of at least one of the plurality of compositional components at each of the plurality of depths; and
temperature of the reservoir.

12. The system of claim 1 wherein the generated density inversion model assumes the fluid contained in the reservoir consists of:
gas transported deeper into the reservoir via diffusion;
maltenes transported deeper into the reservoir via diffusion; and
asphaltenes transported deeper into the reservoir via diffusion and expulsion by transported gas.

13. The system of claim 1 wherein the inputs for the density inversion model include:
pressure of the reservoir;
temperature of the reservoir;
density of the fluid contained in the reservoir;
viscosity of the fluid contained in the reservoir;
composition of the fluid contained in the reservoir;
depth within the reservoir;
time;
the estimated molecular sizes; and wherein the one or more diffusion coefficients include:
a diffusion coefficient $D_{GA}$ between gas and asphaltene components of the fluid contained in the reservoir;
a diffusion coefficient $D_{GM}$ between gas and maltene components of the fluid contained in the reservoir; and
a diffusion coefficient $D_{AM}$ between asphaltene and maltene components of the fluid contained in the reservoir.

14. The system of claim 13 wherein the downhole tool is operable to obtain ones of the density inversion model inputs, including:
the pressure of the reservoir;
the temperature of the reservoir;
the density of the fluid contained in the reservoir;
the viscosity of the fluid contained in the reservoir; and
the composition of the fluid contained in the reservoir.

15. A system comprising:
a downhole tool operable to obtain:
fluid from a subterranean reservoir at each of a plurality of depths within the reservoir; and data associated with the obtained fluid, including gas-oil ratio (GOR) and composition data related to the fluid obtained at each of the plurality of depths; and an apparatus operable to identify at least one condition indicating that a density inversion exists in the fluid contained in the reservoir based on the obtained data, wherein the at least one condition includes at least one of:

a first condition in which there exists a disequilibrium gradient of GOR relative to depth within the reservoir, as determined based on the GOR data at each of the plurality of depths; and a second condition in which there exists an accumulation of asphaltenes proximate a lower base of the reservoir, as determined based on the composition data at each of the plurality of depths;

wherein the apparatus is operable to:

estimate molecular sizes of each of a plurality of compositional components of the fluid contained within the reservoir; and generate a model of the density inversion of the fluid contained within the reservoir based at least in part on the obtained data and the estimated molecular sizes, wherein the generated density inversion model assumes the fluid contained in the reservoir comprises gas, maltenes, and asphaltenes, and wherein inputs for the model of the density inversion comprise one or more diffusion coefficients related to gas, maltene, and asphaltene.

16. The system of claim 15 wherein the apparatus is further operable to:

identify, based on the existence of both of the first and second conditions, that the density inversion is causing an ongoing, gravity-induced current of asphaltenes towards the lower base of the reservoir; and identify, based on the existence of the second condition and the absence of the first condition, that the density inversion previously caused a now-substantially-completed, gravity-induced current of asphaltenes towards the lower base of the reservoir.

17. The system of claim 15 wherein the apparatus is further operable to:

based on the generated density inversion model, estimate an amount of the density inversion, a depth of the density inversion, and a period of time elapsed since the density inversion began to form within the reservoir.

18. The system of claim 17 wherein the apparatus is further operable to generate a model of a gravity-induced current of the density inversion based on the obtained data and the estimated density inversion amount, depth, and elapsed time.

19. A method comprising:

operating a downhole tool to obtain:

fluid from a subterranean reservoir at each of a plurality of depths within the reservoir; and data associated with the obtained fluid, including gas-oil ratio (GOR) and composition data related to the fluid obtained at each of the plurality of depths; and operating an apparatus comprising a processor and a memory including computer program code, including to:

identify at least one condition indicating that a density inversion exists in the fluid contained in the reservoir based on the obtained data, wherein the at least one condition includes at least one of:

a first condition in which there exists a disequilibrium gradient of GOR relative to depth within the reservoir, as determined based on the GOR data at each of the plurality of depths; and a second condition in which there exists an accumulation of asphaltenes proximate a lower base of the reservoir, as determined based on the composition data at each of the plurality of depths;

identify, based on the existence of both of the first and second conditions, whether the density inversion is causing an ongoing, gravity-induced current of asphaltenes towards the lower base of the reservoir;

identify, based on the existence of the second condition and the absence of the first condition, whether the density inversion previously caused a now-substantially-completed, gravity-induced current of asphaltenes towards the lower base of the reservoir;

estimate molecular sizes of each of a plurality of compositional components of the fluid contained within the reservoir utilizing an asphaltene concentration gradient analysis (ACGA) and the obtained data;

generate a model of the density inversion of the fluid contained within the reservoir based at least in part on the obtained data and the estimated molecular sizes, wherein the generated density inversion model assumes the fluid contained in the reservoir comprises gas, maltenes, and asphaltenes and wherein inputs for the model of the density inversion comprise one or more diffusion coefficients related to gas, maltene, asphaltene, or any combination thereof;

based on the generated density inversion model, estimate an amount of the density inversion, a depth of the density inversion, and a period of time elapsed since the density inversion began to form within the reservoir; and generate a model of a gravity-induced current of the density inversion based on the obtained data and the estimated density inversion amount, depth, and elapsed time.

20. The system of claim 15, wherein the generated density inversion model assumes the fluid contained in the reservoir consists of gas, maltenes, and asphaltenes.

* * * * *